US012638995B2

(12) United States Patent
Zheng et al.

(10) Patent No.: US 12,638,995 B2
(45) Date of Patent: May 26, 2026

(54) MACHINE LEARNING-ENABLED MANAGEMENT OF STORAGE MEDIA ACCESS

(71) Applicant: Marvell Asia Pte, Ltd., Singapore (SG)

(72) Inventors: Simeng Zheng, San Diego, CA (US);
Nedeljko Varnica, San Jose, CA (US);
Erich F. Haratsch, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/962,371

(22) Filed: Oct. 7, 2022

(65) Prior Publication Data

US 2023/0110401 A1      Apr. 13, 2023

Related U.S. Application Data

(60) Provisional application No. 63/254,009, filed on Oct. 8, 2021.

(51) Int. Cl.
*G06F 3/06* (2006.01)
*G06F 12/02* (2006.01)
(Continued)

(52) U.S. Cl.
CPC ............ *G06F 3/064* (2013.01); *G06F 3/0604* (2013.01); *G06F 3/0673* (2013.01);
(Continued)

(58) Field of Classification Search
CPC ...... G06F 3/064; G06F 3/0604; G06F 3/0673; G06F 3/0638; G06F 3/0679; G06F 3/061;
(Continued)

(56) References Cited

U.S. PATENT DOCUMENTS

2019/0079697 A1 * 3/2019 Suzuki .................. G06F 3/0659
2019/0114078 A1    4/2019 Oh
(Continued)

FOREIGN PATENT DOCUMENTS

CN        112051969 A  * 12/2020  ............. G06F 3/061
EP         3866015       8/2021

OTHER PUBLICATIONS

Wikipedia, "System on a chip", Dec. 25, 2020, the Internet Archive snapshot of the page from Dec. 25, 2020, pp. 1-16 https://web.archive.org/web/20201225015025/https://en.wikipedia.org/wiki/System_on_a_chip (Year: 2020).*
(Continued)

*Primary Examiner* — Curtis James Kortman
(74) *Attorney, Agent, or Firm* — Colby Nipper PLLC

(57)                    ABSTRACT

The present disclosure describes apparatuses and methods for machine learning-enabled (ML-enabled) management of storage media access. In some aspects, an ML-enabled storage controller obtains features of available blocks of storage media of a storage media system. The controller can receive, from a host system, a request to write data and determine features of the data to be written to the storage media. The controller provides the respective features of the available blocks and the data to a neural network and receives, from the neural network, a selected block of the available blocks for writing of the data. The selected block may include an ML-optimized selection from the available blocks based on the features of both the available blocks and the data. The controller then writes the data of the request to the ML-selected block of storage media of the storage media system, which may improve storage media performance.

20 Claims, 18 Drawing Sheets

(51) Int. Cl.
*G06N 3/045* (2023.01)
*G06N 3/08* (2023.01)

(52) U.S. Cl.
CPC ......... *G06F 12/0246* (2013.01); *G06N 3/045* (2023.01); *G06N 3/08* (2013.01); *G06F 2212/7202* (2013.01)

(58) Field of Classification Search
CPC ........ G06F 12/0246; G06F 2212/7202; G06N 3/045; G06N 3/08; G06N 3/044
See application file for complete search history.

(56) References Cited

U.S. PATENT DOCUMENTS

| | | | |
|---|---|---|---|
| 2020/0110536 A1* | 4/2020 | Navon | G06F 3/0616 |
| 2020/0150892 A1* | 5/2020 | Kim | G06F 3/0604 |
| 2020/0393991 A1* | 12/2020 | Kachare | G06F 3/0604 |
| 2021/0223954 A1 | 7/2021 | Yang et al. | |
| 2021/0373774 A1* | 12/2021 | Rangan | G06F 12/084 |
| 2022/0188028 A1* | 6/2022 | Mesnier | G06F 3/067 |
| 2022/0245670 A1* | 8/2022 | Cao | G06N 3/04 |

OTHER PUBLICATIONS

"International Search Report and Written Opinion", Application No. PCT/IB2022/059642, Jan. 16, 2023, 13 pages.
"International Preliminary Report on Patentability", Application No. PCT/IB2022/059642, Apr. 9, 2024, 10 pages.

* cited by examiner

Figure 1:
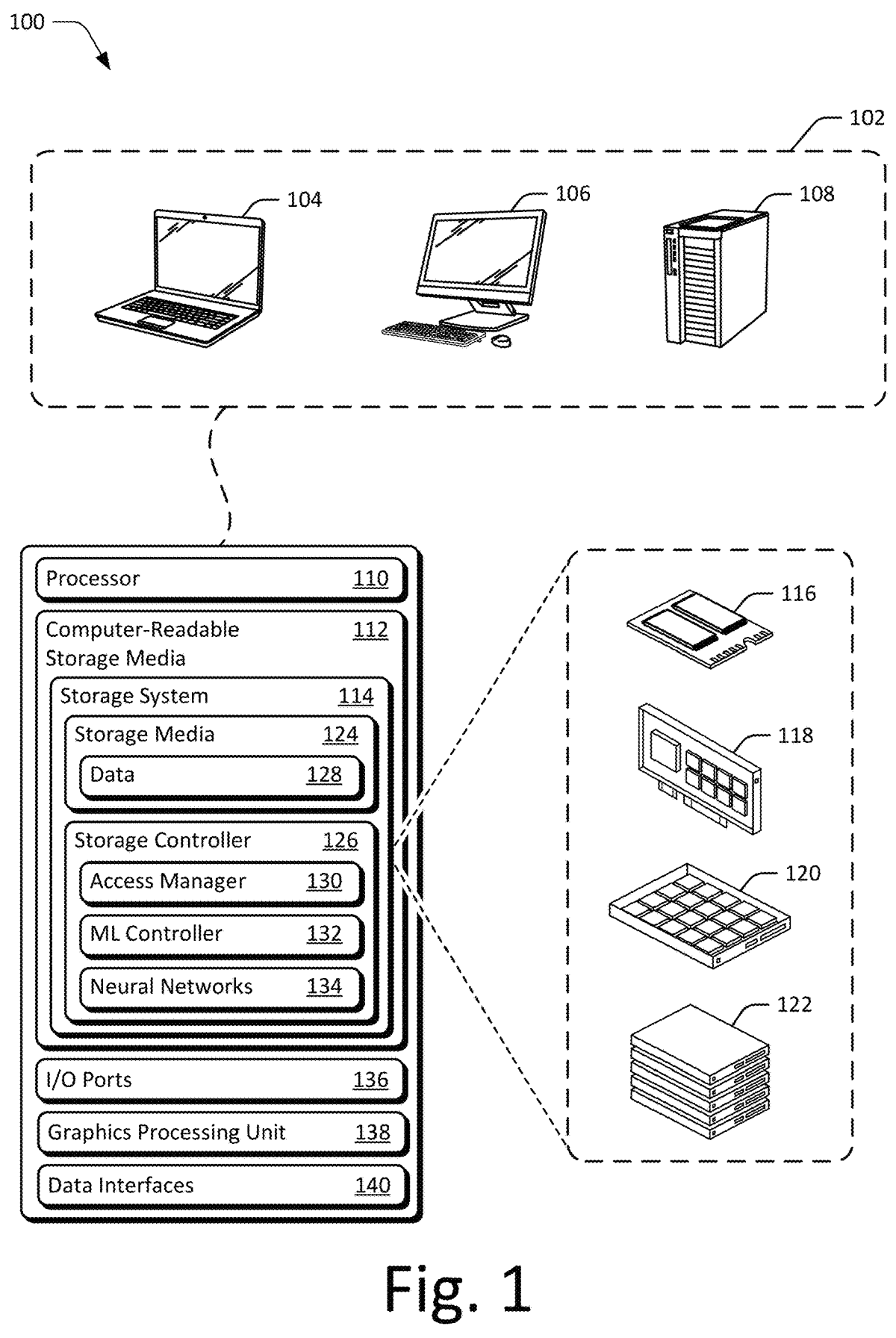

100

102

104

106

108

| Processor | 110 |
| --- | --- |

| Computer-Readable Storage Media | 112 |
| --- | --- |

| Storage System | 114 |
| --- | --- |

| Storage Media | 124 |
| --- | --- |

| Data | 128 |
| --- | --- |

| Storage Controller | 126 |
| --- | --- |

| Access Manager | 130 |
| --- | --- |

| ML Controller | 132 |
| --- | --- |

| Neural Networks | 134 |
| --- | --- |

| I/O Ports | 136 |
| --- | --- |

| Graphics Processing Unit | 138 |
| --- | --- |

| Data Interfaces | 140 |
| --- | --- |

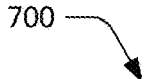
700
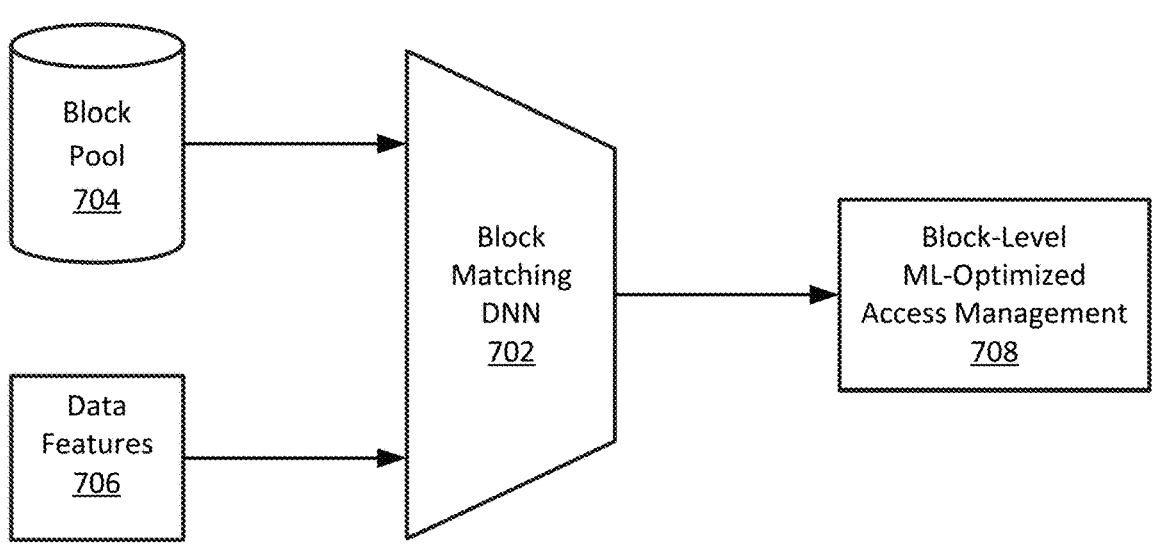
Fig. 7

| Label 1104 | Input Data 1106 | | |
|---|---|---|---|
| ML-Optimized Block Selection 1108 | Block Candidates (PE feature) 1110 | Block Candidates (BER feature) 1112 | Block Candidates (data feature) 1114 |
| Block ID {'pe':pe* , 'ber':ber* , 'grade':grade*} 1116 | Block Candidates {'pe': pe ≥ pe*} 1118 | Block Candidates {'ber': ber ≥ ber*} 1120 | Block Candidates {'grade': grade = grade*} 1122 |

Dataset Formulation
1102

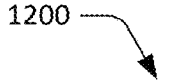
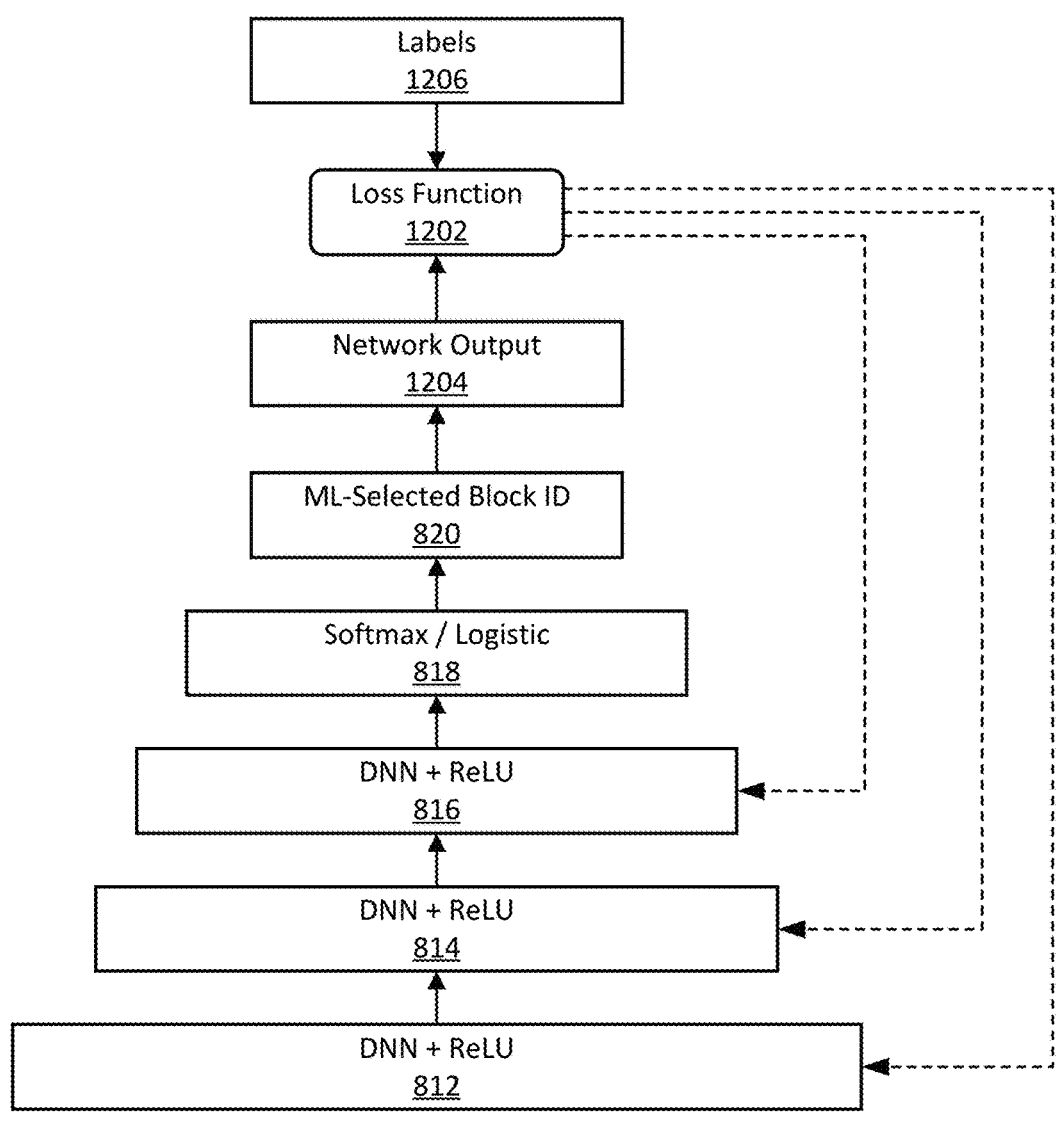
Fig. 12

1300

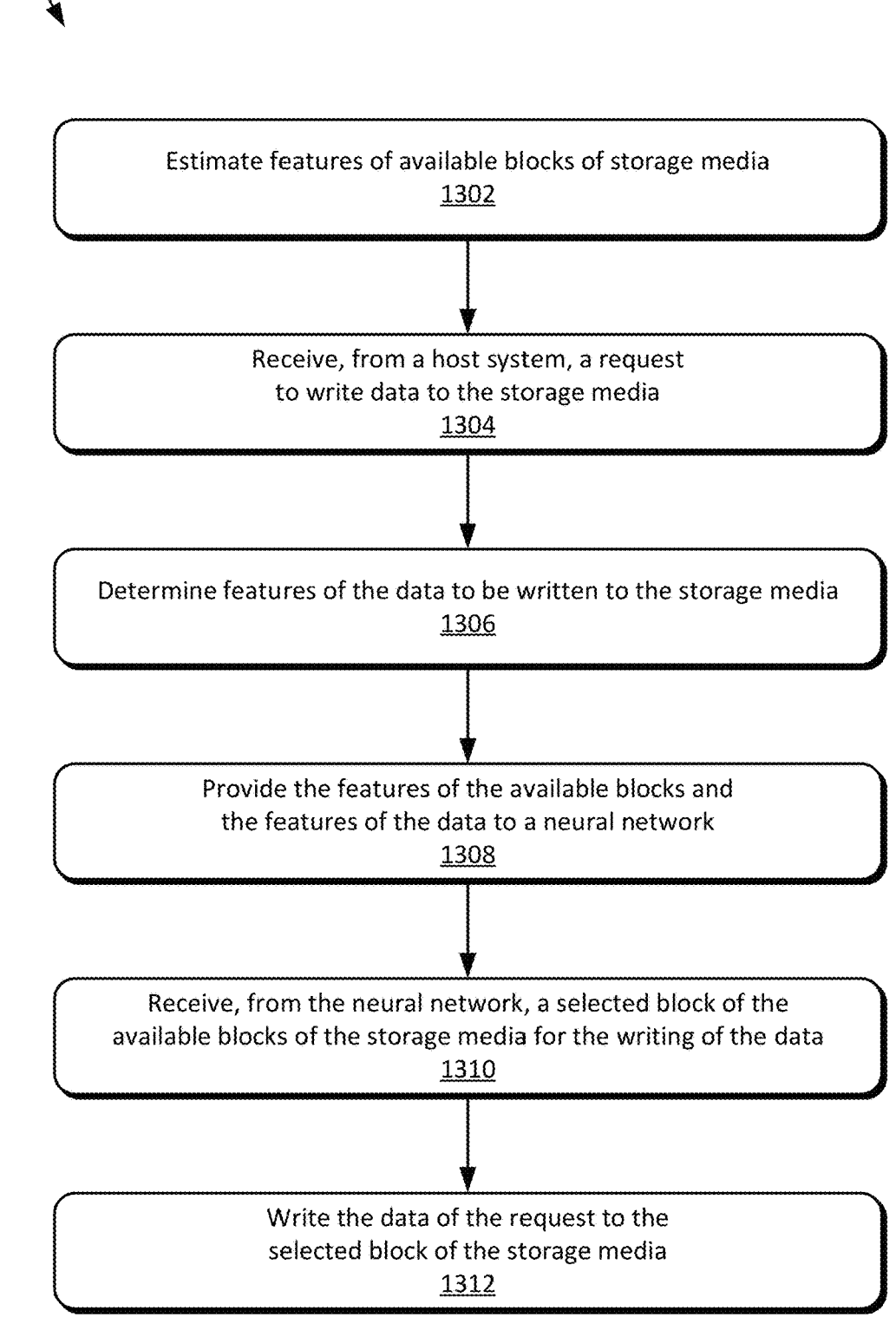

Estimate features of available blocks of storage media
1302

Receive, from a host system, a request
to write data to the storage media
1304

Determine features of the data to be written to the storage media
1306

Provide the features of the available blocks and
the features of the data to a neural network
1308

Receive, from the neural network, a selected block of the
available blocks of the storage media for the writing of the data
1310

Write the data of the request to the
selected block of the storage media
1312

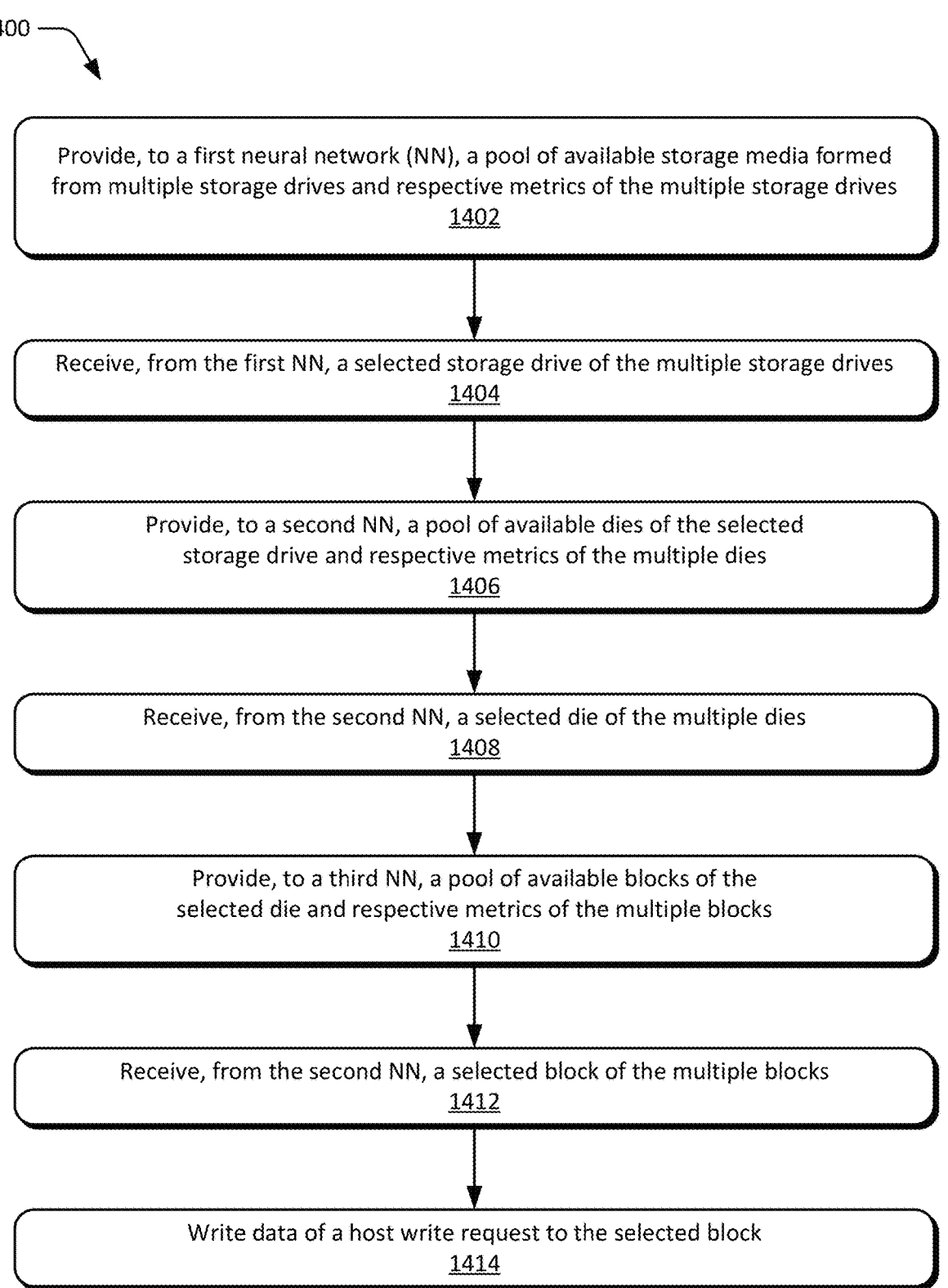

Provide, to a first neural network (NN), a pool of available storage media formed from multiple storage drives and respective metrics of the multiple storage drives
1402

Receive, from the first NN, a selected storage drive of the multiple storage drives
1404

Provide, to a second NN, a pool of available dies of the selected storage drive and respective metrics of the multiple dies
1406

Receive, from the second NN, a selected die of the multiple dies
1408

Provide, to a third NN, a pool of available blocks of the selected die and respective metrics of the multiple blocks
1410

Receive, from the second NN, a selected block of the multiple blocks
1412

Write data of a host write request to the selected block
1414

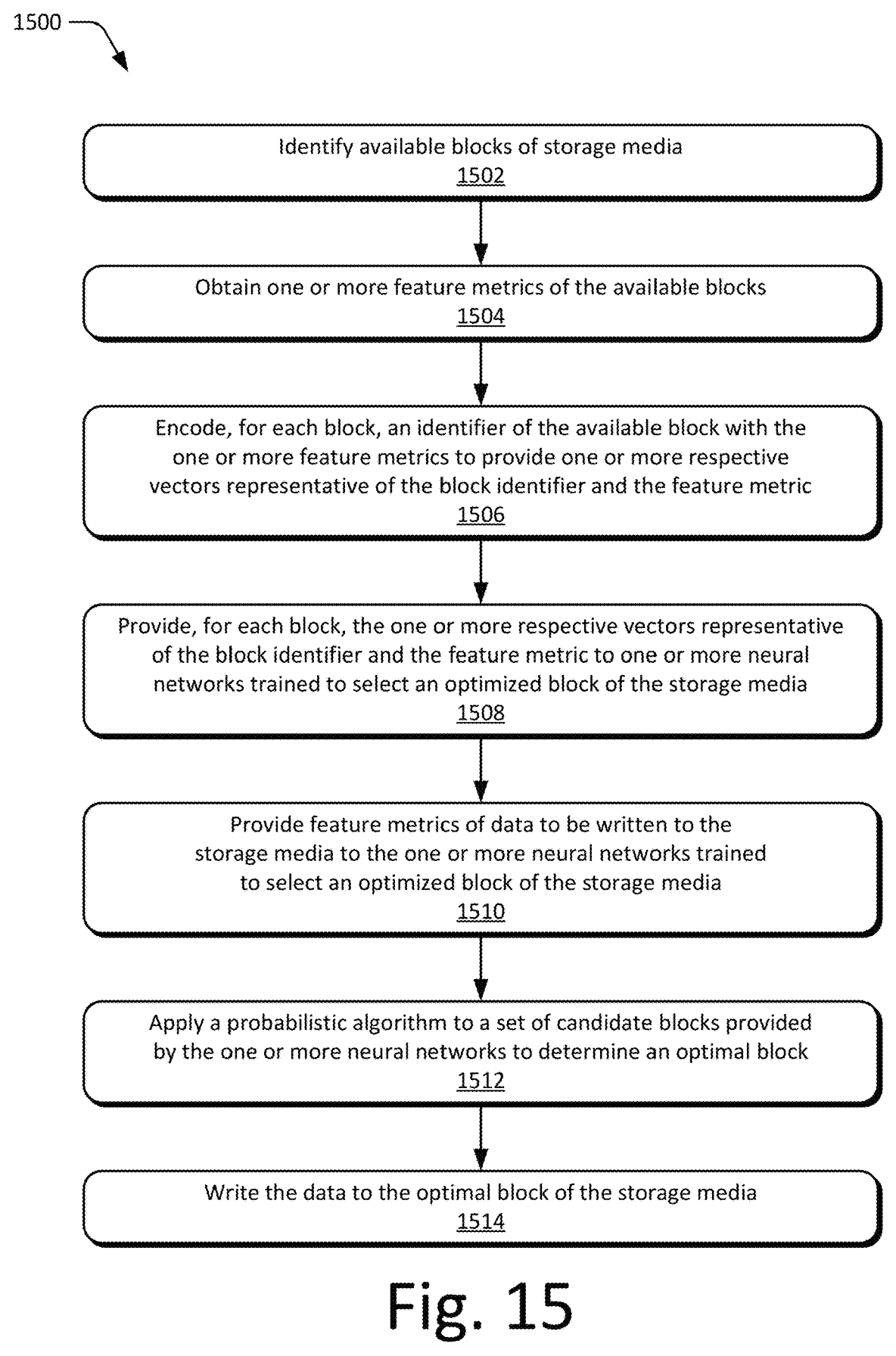

```
┌─────────────────────────────────────────────────────────────┐
│           Identify available blocks of storage media         │
│                            1502                              │
└─────────────────────────────────────────────────────────────┘
                              │
                              ▼
┌─────────────────────────────────────────────────────────────┐
│        Obtain one or more feature metrics of the available blocks │
│                            1504                              │
└─────────────────────────────────────────────────────────────┘
                              │
                              ▼
┌─────────────────────────────────────────────────────────────┐
│   Encode, for each block, an identifier of the available block with the │
│   one or more feature metrics to provide one or more respective │
│   vectors representative of the block identifier and the feature metric │
│                            1506                              │
└─────────────────────────────────────────────────────────────┘
                              │
                              ▼
┌─────────────────────────────────────────────────────────────┐
│  Provide, for each block, the one or more respective vectors representative │
│  of the block identifier and the feature metric to one or more neural │
│  networks trained to select an optimized block of the storage media │
│                            1508                              │
└─────────────────────────────────────────────────────────────┘
                              │
                              ▼
┌─────────────────────────────────────────────────────────────┐
│        Provide feature metrics of data to be written to the  │
│     storage media to the one or more neural networks trained │
│         to select an optimized block of the storage media    │
│                            1510                              │
└─────────────────────────────────────────────────────────────┘
                              │
                              ▼
┌─────────────────────────────────────────────────────────────┐
│   Apply a probabilistic algorithm to a set of candidate blocks provided │
│   by the one or more neural networks to determine an optimal block │
│                            1512                              │
└─────────────────────────────────────────────────────────────┘
                              │
                              ▼
┌─────────────────────────────────────────────────────────────┐
│          Write the data to the optimal block of the storage media │
│                            1514                              │
└─────────────────────────────────────────────────────────────┘
```

Fig. 15

1600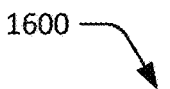

Generate a dataset of multiple entries that comprise, for each block, a block identifier with respective metrics associated with the block
1602

Label one of the entries of the data set based on the respective metrics associated with the block identifier
1604

Replace the labeled entry with a new entry for the dataset
1606

Compare an output provided by a neural network based on the dataset with the labels generated for the dataset
1608

Update weights of the neural network based on the comparison of the output of the neural network and the labels generated for the dataset
1610

Fig. 16

MACHINE LEARNING-ENABLED MANAGEMENT OF STORAGE MEDIA ACCESS

CROSS REFERENCE TO RELATED APPLICATION

This present disclosure claims priority to U.S. Provisional Patent Application Ser. No. 63/254,009 filed Oct. 8, 2021, the disclosure of which is incorporated by reference herein in its entirety.

BACKGROUND

Many computing and electronic devices include non-volatile memory for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of data storage centers to support the data access associated with these activities of users and other data storage clients. Generally, the storage industry has leveraged advancements in solid-state storage technology to reduce costs and increase storage density of data storage centers. Transitioning from magnetic storage media to solid-state storage media, however, typically introduces different performance issues associated with solid-state storage media. As such, preceding techniques of storage media management developed around magnetic based storage media are often unable to address these performance issues of solid-state storage media.

SUMMARY

This summary is provided to introduce subject matter that is further described in the Detailed Description and Drawings. Accordingly, this Summary should not be considered to describe essential features nor used to limit the scope of the claimed subject matter.

In some aspects, a media access manager of a storage media system implements a method that obtains features of available blocks of storage media of the storage media system. The method receives, from a host system, a request to write data to the storage media and determines features of the data to be written to the storage media. The method provides the features of the available blocks and the features of the data to a neural network and receives, from the neural network, a selected block of the available blocks of the storage media for writing of the data of the request. The selected block of storage media may be an optimal block based on features of the available block and the features of the data received from the host. The method then writes the data of the request to the selected block of storage media of the storage media system to complete the write request. By writing the data to an optimal block of the storage media, the method may improve performance of the storage media system, which may include reducing read latency or enhancing endurance of the storage media.

In other aspects, an apparatus comprises a host interface configured for communication with a host system, storage media to store data of the host system, and a media interface configured to enable access to the storage media. The apparatus also includes a media access controller and a machine learning-enabled (ML-enabled) controller configured to implement a neural network. The media access manager is configured to obtain features of available blocks of the storage media of the apparatus. The media access manager may receive, from the host system, a request to write data to the storage media of the apparatus and determine features of the data to be written to the storage media. The media access manager provides the features of the available blocks and the features of the data to the ML-enabled controller and receives, from the ML-enabled controller, a selected block of the available blocks of the storage media for writing of the data of the request. The media access controller then writes the data of the request to the selected block of storage media of the apparatus to complete the request of the host.

In yet other aspects, a System-on-Chip (SoC) is described that includes a media interface to access storage media of a storage system, a host interface to communicate with a host system, and a machine learning controller that is configured to implement a neural network. The SoC also includes a hardware-based processor and a memory storing processor-executable instructions that, responsive to execution by the hardware-based processor, implement a media access manager to obtain features of available blocks of the storage media of the storage media system. The media access manager can receive, from the host system, a request to write data to the storage media of the storage media system and determine features of the data to be written to the storage media. The media access manager provides the features of the available blocks and the features of the data to the ML-enabled controller and receives, from the ML-enabled controller, a selected block of the available blocks of the storage media for writing of the data of the request. The media access controller then writes the data of the request to the selected block of storage media of the storage media system to complete the request of the host.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of machine learning-enabled (ML-enabled) management of storage media access are set forth in the accompanying figures and the detailed description below. In the figures, the left-most digit of a reference number identifies the figure in which the reference number first appears. The use of the same reference numbers in different instances in the description and the figures indicates like elements:

FIG. 1 illustrates an example operating environment having systems in which an ML-enabled storage media controller is implemented in accordance with one or more aspects of the disclosure;

FIG. 7 illustrates an example configuration of a deep neural network that may implement aspects of ML-enabled management of storage media access;

FIG. 11 illustrates an example dataset formulation for training a neural network to implement aspects of ML-enabled wear leveling in accordance with one or more aspects;

FIG. 12 illustrates an example of updating weights of a neural network architecture that is configured to implement aspects of ML-enabled management of storage media access;

FIG. 13 depicts an example method for ML-enabled management of storage media access in accordance with one or more aspects;

FIG. 14 depicts an example method for implementing ML-enabled management of storage media access with multiple neural networks;

FIG. 15 depicts an example method for ML-enabled management of storage media access with embedding networks;

FIG. 16 depicts an example method for training an ML-enabled storage controller in accordance with one or more aspects;

DETAILED DESCRIPTION

Figure 2:
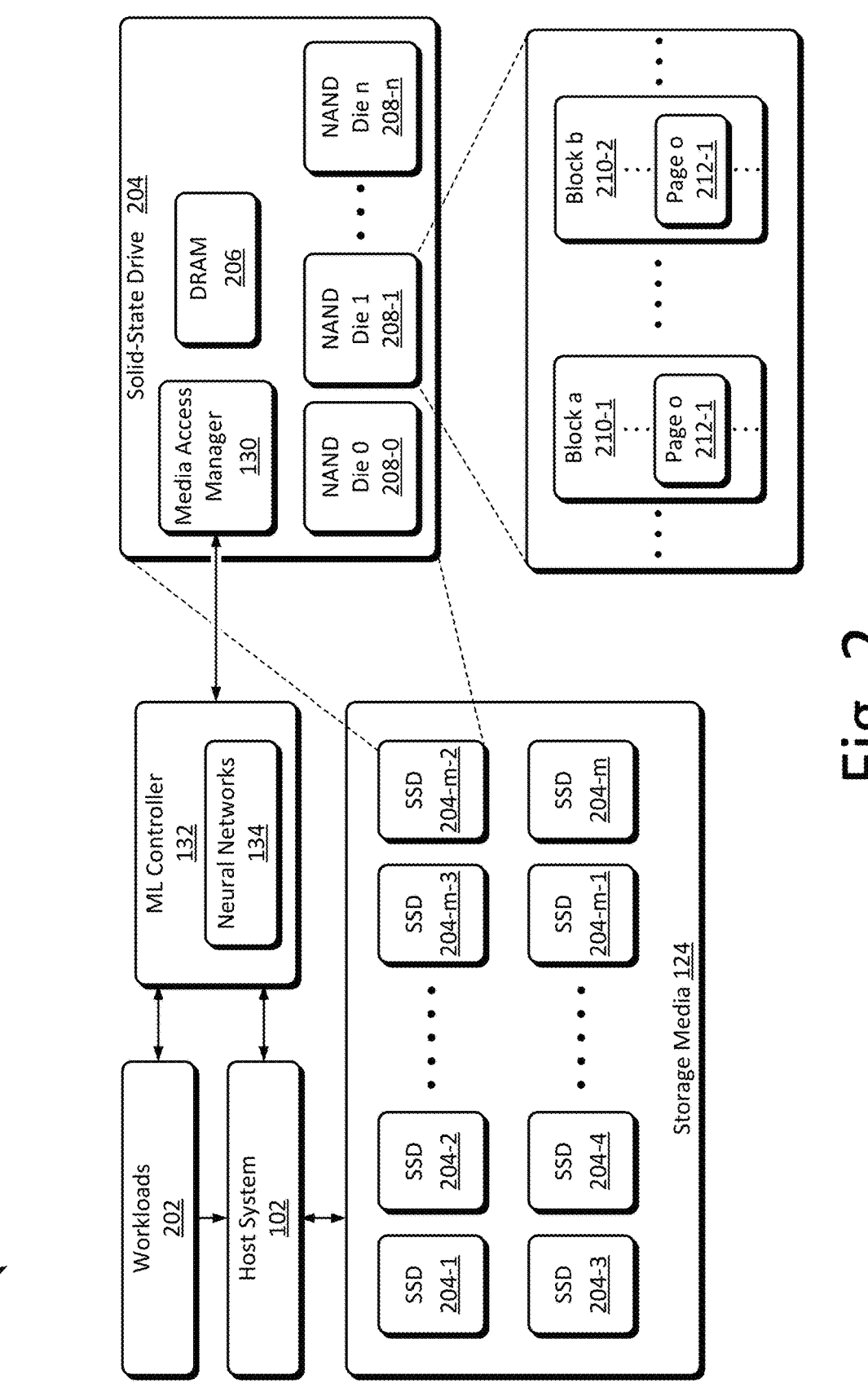
FIG. 2 illustrates an example configuration of data storage system components that may implement aspects of ML-enabled management of storage media access in accordance with one or more aspects.

Data storage centers include and support large numbers of storage drives for storing data for a wide variety of hosts, services, and tenants. For example, a data storage center (DSC) may have hundreds of servers, with each server housing hundreds of storage drives that form units of server storage for the DSC. Accordingly, storage drive performance can be critical to maintaining service levels for data storage and data center costs, such that trends in individual storage drive performance may, in aggregate, affect overall costs of a DSC. Generally, the storage industry has leveraged advancements in solid-state storage technology to reduce costs and increase storage density of data storage centers. Transitioning from magnetic storage media to solid-state storage media, however, typically introduces different performance issues associated with solid-state storage media. For example, solid-state storage media may exhibit large variations across storage drives and memory modules, different error mechanisms due to the difference in the noise characteristics with the solid-state storage media (e.g., read distortions, inter-cell interference), and so forth. Typically, preceding techniques aimed to address these issues were often simple and deterministic, focusing on only one media access metric and failing to account for others associated with large variations in storage media and variety of tenants and workload types hosted by a data center. As such, the preceding techniques are often unable to address the performance issues of solid-state storage media or account for different types of workloads and data handled by host systems. In the context of a DSC, in which large numbers of solid-state drives are deployed, these unaddressed performance issues can scale and compound across the deployed storage drives to result in impaired data center performance and component cost increases due to shortened lifetimes of the solid-state storage drives.

This disclosure describes apparatuses and techniques for ML-enabled management of storage media access. In contrast with preceding techniques of storage media access, the described apparatuses and techniques may implement ML-enabled-management of storage media access for optimized access of storage media, including solid-state storage media (e.g., NAND Flash memory). In the described aspects, an ML-enabled storage controller may estimate characteristics or features of available units of solid-state storage media for storing data (e.g., storage drives, dies, blocks), as well as characteristics or features of the data to be written to the solid-state storage media. In other words, the ML-enabled storage controller can estimate the characteristics of each block, die, or storage drive and exploit this information through the application of a neural network in the data placement process (e.g., data-to-block mapping) to map data of host write requests to an optimal location in solid-state storage media of a storage system.

Generally, aspects of ML-enabled management of storage media access may use one or more neural networks to assist a host or media access controller with placing data based on multiple features or characteristics of the solid-state storage media and/or the data to be placed. In some aspects, an ML-enabled controller implements a staged neural network with three levels to assist in data placement at various units of storage. For example, the ML-enabled controller may include a solid-state drive (SSD) matching neural network, a NAND die matching network, and a block matching network, where SSD, NAND die, and/or block selection is adaptive for different available NAND flash and workloads of a host. Thus, block-level management may incorporate multiple features or characteristics of the available block and properties of the data to be written using machine learning with integrated factors. By so doing, the adaptive ML-enabled storage controller may reduce read latency and enhance the endurance of the storage drives through ML-optimized placement of data, which can result in longer storage drive lifetimes and improved quality of service for the data storage center.

In various aspects of ML-enabled management of storage media access, an ML-enabled storage controller obtains features of available blocks of storage media of a storage media system. The controller can receive, from a host system, a request to write data and determine features of the data to be written to the storage media. The controller provides the respective features of the available blocks and the data to a neural network and receives, from the neural network, a selected block of the available blocks for writing of the data. The selected block may include an ML-optimized selection from the available blocks based on the features of both the available blocks and the data. The controller then writes the data of the request to the ML-selected block of storage media of the storage media system, which may improve storage media access performance. By so doing, the method may improve performance of the storage media system, which may include reduced read latency or enhanced endurance of the storage media.

The following discussion describes an operating environment, techniques that may be employed in the operating environment, and a System-on-Chip (SoC) in which components of the operating environment may be embodied. In the context of the present disclosure, reference is made to the operating environment or various components by way of example only.

Operating Environment

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network, data storage center, cloud storage, or the like. Further examples of host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. In aspects, the processors 110 of a host system may execute tenants, services, or workloads of a data storage system or data storage center. The computer-readable media 112 (CRM 112) includes memory (not shown) and a storage system 114 of the host system 102. The memory of the host system 102 may include any suitable type or combination of volatile memory or nonvolatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM), solid-state storage media, or Flash memory.

The storage system 114 of the host system 102 may be configured as any suitable type of data storage system, such as a data storage center, storage device, storage drive, storage array, storage volume, or the like. Although described with reference to the host system 102, the storage system 114 may also be implemented separately as a stand-alone device or as part of a larger storage collective, such as a network-attached storage device, external storage drive, data storage center, server farm, or virtualized storage system (e.g., for cloud-based storage or services). Examples of the storage system 114 include a non-volatile memory express (NVMe) solid-state drive 116, a peripheral component interconnect express (PCIe) solid-state drive 118, a solid-state drive 120 (SSD 120), and a storage array 122, which may be implemented with any combination of storage devices or storage drives.

The storage system 114 includes storage media 124 and a storage media controller 126 (storage controller 126) for managing various operations or functionalities of the storage system 114. The storage media 124 may include or be formed from non-volatile memory devices on which data 128 or information of the host system 102 is stored. The storage media 124 may be implemented with any type or combination of solid-state memory media, such as Flash, NAND Flash, RAM, DRAM (e.g., for caching), SRAM, or the like. For example, the storage media 124 of the storage system 114 may include NAND Flash memory, single-level cell (SLC) Flash memory, multi-level cell (MLC) Flash memory, triple-level cell (TLC) Flash, quad-level cell Flash (QLC), NOR cell Flash, or any combination thereof. These memories, individually or in combination, may store data associated with a user, applications, tenant, workload, service, and/or an operating system of host system 102.

Generally, the storage controller 126 manages operation of the storage system 114 and enables the host system 102 to access the storage media 124 for data storage. The storage controller 126 may be implemented through any suitable combination of hardware, firmware, or software to provide various functionalities of the storage system 114. The storage controller 126 may also manage or administrate internal tasks or operations associated with the storage media 124, which may include data placement, data-to-block mapping, data caching, data migration, garbage collection, thermal management (e.g., throttling), power management, or the like. As such, the storage controller 126 may receive host I/Os from the host system 102 for data access and queue (or generate) internal I/Os associated with internal operations for the storage media 124. Generally, the storage controller 126 may perform media I/Os for access of the storage media 124 that correspond to scheduled host I/Os for data access (e.g., host write requests or read requests) and/or internal I/Os for internal operations or tasks associated with the storage media 124.

In this example, the storage controller 126 also includes a storage media access manager 130 (media access manager 130), a machine learning-enabled controller 132 (ML controller 132) and neural networks 134 (neural networks 134). In other configurations, the storage controller 126 may have access to an ML controller 132 or neural networks 134 that are implemented separately from the storage controller 126. In various aspects, the media access manager 130 uses the ML controller 132 and neural networks 134, which may be configured to assist or optimize data placement in the storage media 124 of the storage system 114. Generally, the ML controller 132 may implement predictive or ML-optimized placement of data in the storage media through the neural networks 134. In some cases, the ML controller 132 provides ML-optimized block selections or page address to the media access manager, which may then write data to the ML-optimized block selections or page addresses to improve performance of the storage system.

For example, the ML controller 132 may obtain features of available drives, dies, or blocks of storage media of a storage media system. The ML controller 132 or media access manager 130 can receive, from a host of the system, a request to write one or more blocks of data and determine characteristics or features of the data associated with the write request. The ML controller 132 provides the respective features of the available drives, dies, and/or blocks and the characteristics of the data (e.g., data-hotness) to one or more neural networks 134 of the ML controller 132. From the neural networks, the ML controller 132 receives an indication of a selected drive, selected die, and/or selected block of the available storage media for the writing of the one or more blocks data. In aspects, the selected drive, selected die, or selected block may include an ML-optimized selection from the available storage media based on the features of both the available units of storage media, characteristics of the data, and integrated factors of the neural networks. The media access manager may then write the one or more blocks of data to the selected drive, selected die, and/or selected blocks of storage media of the storage media system. By so doing, the ML controller 132 and neural networks 134 may improve performance of the storage media system, which may include reduced read latency or enhanced endurance of the storage media. This is but one example of ML-enabled management of storage media access, other of which are described throughout the disclosure.

Returning to FIG. 1, the host system 102 may also include I/O ports 136, a graphics processing unit 138 (GPU 138), and data interfaces 140. Generally, the I/O ports 136 allow a host system 102 to interact with other devices, peripherals, or users. For example, the I/O ports 136 may include or be coupled with a universal serial bus, human interface devices, audio inputs, audio outputs, or the like. The GPU 138 processes and renders graphics-related data for host system 102, such as user interface elements of an operating system, applications, or the like. In some cases, the GPU 138 accesses a portion of local memory to render graphics or includes dedicated memory for rendering graphics (e.g., video RAM) of the host system 102.

The data interfaces 140 of the host system 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage system 114 of the host system 102 in accordance with one or more aspects of ML-enabled management of storage media access.

FIG. 2 illustrates at 200 an example configuration of data storage system components that may implement aspects of ML-enabled management of storage media access in accordance with one or more aspects. In this example, ML controller 132 and neural networks are illustrated in the context of a storage system implemented with a host system 102 that is configured to manage data workloads 202 (workloads 202), which may be associated with respective tenants, services, applications, or the like. Generally, the host system 102 manages storage and access of the data of the workloads 202 to an array of SSDs 204 that form a pool of storage media 124. The storage media 124 of the storage system may include any suitable number of storage drives or devices, and in this example includes SSD 204-1 through SSD 204-n, where m is any suitable integer. Although shown with one host and one array or pool of storage media 124, a storage system or data storage center may be implemented with any number of hosts 102 operably coupled with one or more arrays of storage media 124, respectively.

In aspects, storage media of a data storage system or data storage center can be structured or organized in a hierarchical fashion of units of storage capacity, through which data placement may be implemented with progressively more specific selections or locations at which to write or place data. For example, an array of storage media of a data storage center may be structured from the storage drives (e.g., SSDs) or modules of the array, to storage devices or dies (e.g., NAND dies) of the storage drive, to groups or collections of storage cells (e.g., blocks or pages) of the die. As shown in FIG. 2, an example SSD 204 of the array may include an instance of a media access manager 130, DRAM 206 (e.g., for buffering data), and multiple NAND dies 208 of storage media. The SSD 204 may include any suitable number of NAND dies 208, and in this example includes NAND die 208-0 through 208-n, where n is any suitable integer.

In the context of the storage system, a function or role of the host system 102 (or host) includes allocating data of write workloads to a selected SSD 204 of the storage media 124. At the SSD-level, the media access manager 130 of the SSD 204 may then map write content (data) to a selected NAND die 208 within the SSD 204. Each of the NAND dies 208 may include any suitable number (e.g., hundreds) of blocks 210, of which block a 210-1 and block b 210-2 of the hundreds of blocks are shown as examples. Generally, each block includes an array (e.g., 2D array) of hundreds of rows of Flash memory storage cells to which the media access manager 130 writes contiguous pieces or portions of data. At the block-level, the media access manager 130 or controller of the SSD may map the write content at a unit of a page of storage cells, where one block may include thousands of pages addressable by the media access manager.

In aspects of ML-enabled management of storage media access, the ML controller 132 may interact with the workloads 202, the host system 102 (or host), and/or the media access manager 130 to assist with the placement of write content through the use ML-based algorithms and/or neural network 134. Thus, the ML controller 132 can assist the host system 102 in selecting an SSD 204 to write data of a workload 202 based on characteristics of the data and characteristics of the SSDs 204 from which the target SSD 204 is selected (e.g., the SSD selected to match the data). Alternatively or additionally, the ML controller 132 can assist the media access manager 130 with selecting a NAND die 208, a block 210, and/or page 212 at which to the data based on characteristics of the data and respective characteristics of the NAND die, block, or page. By selecting optimal data placement location based on characteristics of both the data and units of storage media, the aspects of ML-enabled management of storage media access may reduce read latency associated with accessing the data and enhance the lifetime of SSDs of the storage system.

In aspects, the ML controller 132 may include or be operably associated with multiple neural networks configured to assist the host system 102 or media access manager 130 by implementing ML-enabled optimization of write data placement as described herein. In some cases, the ML controller 132 may interact with the host system 102 for ML-enabled SSD selection and interact with the media access manager 130 (or SSD controller) for ML-enabled NAND die selection and/or block selection. As such, the ML controller 132 may communicate or exchange information with the host system 102 and the media access manager 130 to implement ML-enabled management of storage media access. Alternatively or additionally, the ML controller 132 may communicate with the workloads 202 to determine characteristics of respective write content or data the workloads provide to the host for storing to the storage system. Although illustrated as components of the storage system, the media access manager 130 and/or ML controller 132 may be implemented separately from or external to a storage system 114. For example, the media access manager 130 or ML controller 132 can be implemented as part of a storage media accelerator or aggregate storage controller coupled between a host system 102 and one or more storage systems 114.

Figure 3:
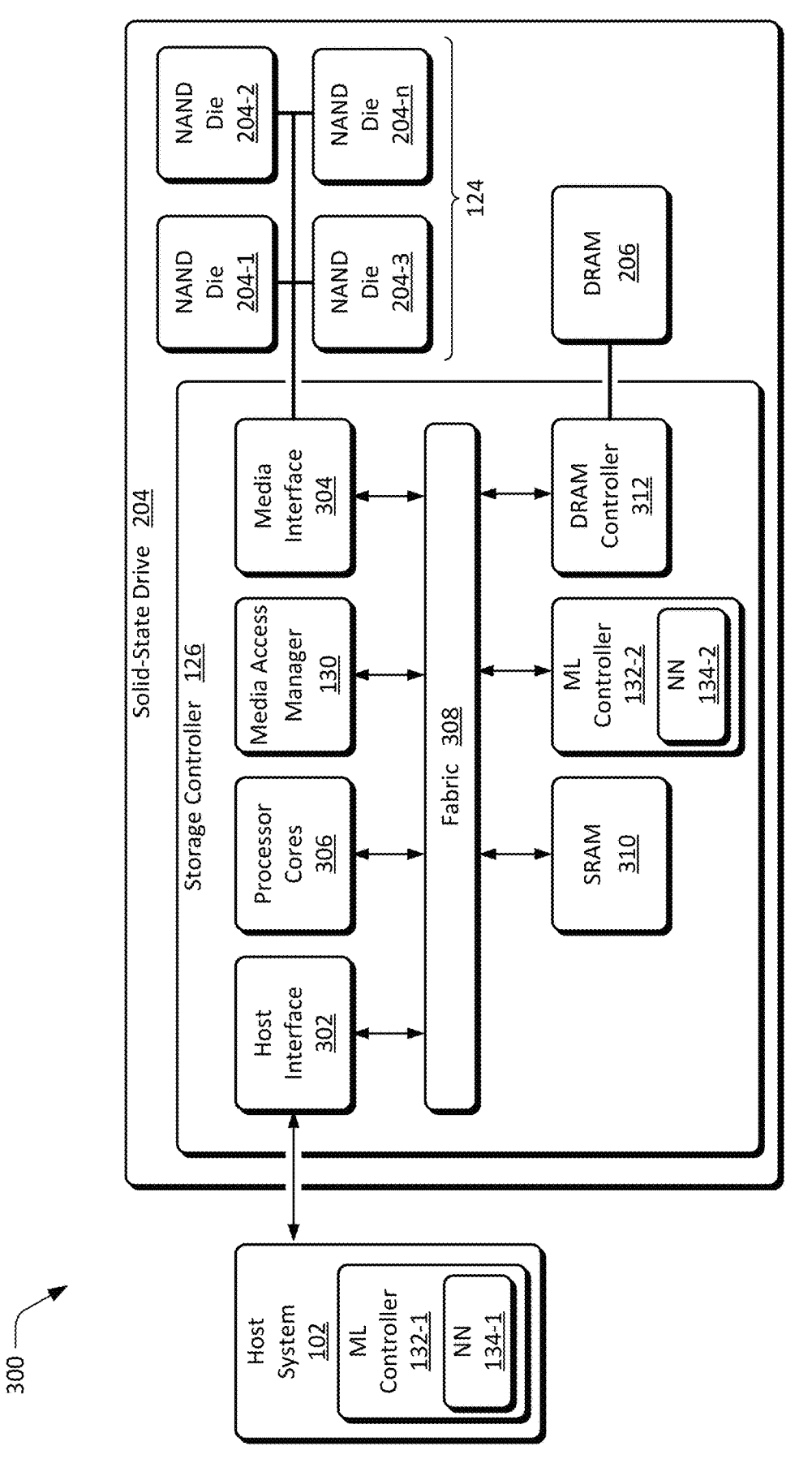
FIG. 3 illustrates an example configuration of the solid-state drive and the ML controller of the data storage system of FIG. 2.

FIG. 3 illustrates at 300 an example configuration of the solid-state drive 204 and the ML controller 132 of the data storage system of FIG. 2. The ML controller 132 may interact with the host system 102 and/or the storage controller 126 to implement aspects of ML-enabled management of storage media access. In aspects, the storage system can be implemented with multiple instances of the ML controller 132, which may communication with each other to implement ML-enabled management of storage media access. In this example, the host system 120 includes ML controller 132-1 and neural networks 134-1 (NN 134-1), which may be configured to provide ML-optimized selections of SSDs from which the storage system is formed, including the illustrated SSD 204. The storage controller 126 includes another instance of an ML controller in the form of ML controller 132-2 and neural networks 134-2 (NN 134-2), which may be configured to provide ML-optimized selections of NAND dies and/or block of NAND pages for data placement. In some cases, additional SSDs (not shown) of the storage system may be configured similar to SSD 204 with respective instances of onboard ML controllers and neural networks. In aspects, the ML controller 132-1 of the host system 102 may communicate with the ML controller 132-2 of the SSD 204 to exchange information, which may include various metrics for write content of workloads, metrics of SSD lifetime, or metrics of storage media, examples of which are described herein.

In this example, the media access manager 130 and ML controller 132 are illustrated in the context of a storage system 114 that is implemented as a solid-state storage drive (SSD) 204. The SSD 204 may be coupled to any suitable host system 102 and implemented with storage media 124 that includes multiple NAND Flash dies 208-1 through 208-n, where n is any suitable integer. In some cases, the NAND dies 208 form a NAND device that includes multiple Flash channels of memory devices, dies, or chips that may be accessible or managed on a channel-level (group of dies), device-level (individual dies), or block-level (individual blocks or pages of storage media cells). Although illustrated as components of the SSD 204, the media access manager 130 and/or ML controller 132 may be implemented separately from or external to a storage system 114. In some cases, the media access manager 130 or ML controller 132 are implemented as part of a storage media accelerator or aggregate storage controller coupled between a host system 102 and one or more storage systems 114.

Generally, operations of the SSD 204 are enabled or managed by an instance of the storage controller 126, which in this example includes a host interface 302 to enable communication with the host system 102 and a media interface 304 to enable access to the storage media 124. The host interface 302 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 304 may implement any suitable type of storage media interface, such as a Flash interface, Flash bus channel interface, NAND channel interface, physical page addressing (PPA) interface, or the like.

In various aspects, components of the SSD 204 or storage controller 126 provide a data path between the host interface 302 to the host system 102 and the media interface 304 to the storage media 124. In this example, the storage controller 126 includes processor cores 306 for executing a kernel, firmware, or a driver to implement functions of the storage controller 126. In some cases, the processor cores 306 may also execute processor-executable instructions to implement the media access manager 130 or the ML controller 132 of the storage controller 126. Alternately or additionally, the media access manager 130 or the ML controller 132 may execute from or run on ML-specific hardware, AI engines, or processor cores.

As shown in FIG. 3, a fabric 308 of the storage controller 126, which may include control and data buses, operably couples and enables communication between the components of the storage controller 126. For example, the media access manager 130 or ML controller 132 may communicate with the host interface 302, processor cores 306 (e.g., firmware), or media interface 304 to exchange data, information, or I/Os within the storage controller 126. In aspects, the media access manager 130 may implement data-to-die mapping or data-to-block mapping of the data written by the storage controller to the storage media 124. Generally, the ML controller 132 may use the neural networks 134 to assist with or provide ML-optimized mappings to the media access manager 130 to facilitate ML-enabled mapping of write content to the dies and/or blocks of the storage media 124. A static random-access memory 310 (SRAM 310) of the storage controller 126 may store processor-executable instructions or code for firmware or drivers of the storage controller, which may be executed by the processor cores 306. The storage controller 126 may also a dynamic random-access memory (DRAM) controller 312 and associated a DRAM 206 for storage or caching various data as the storage controller 126 moves data between the host system 102, storage media 124, or other components of the storage controller.

Figure 4:
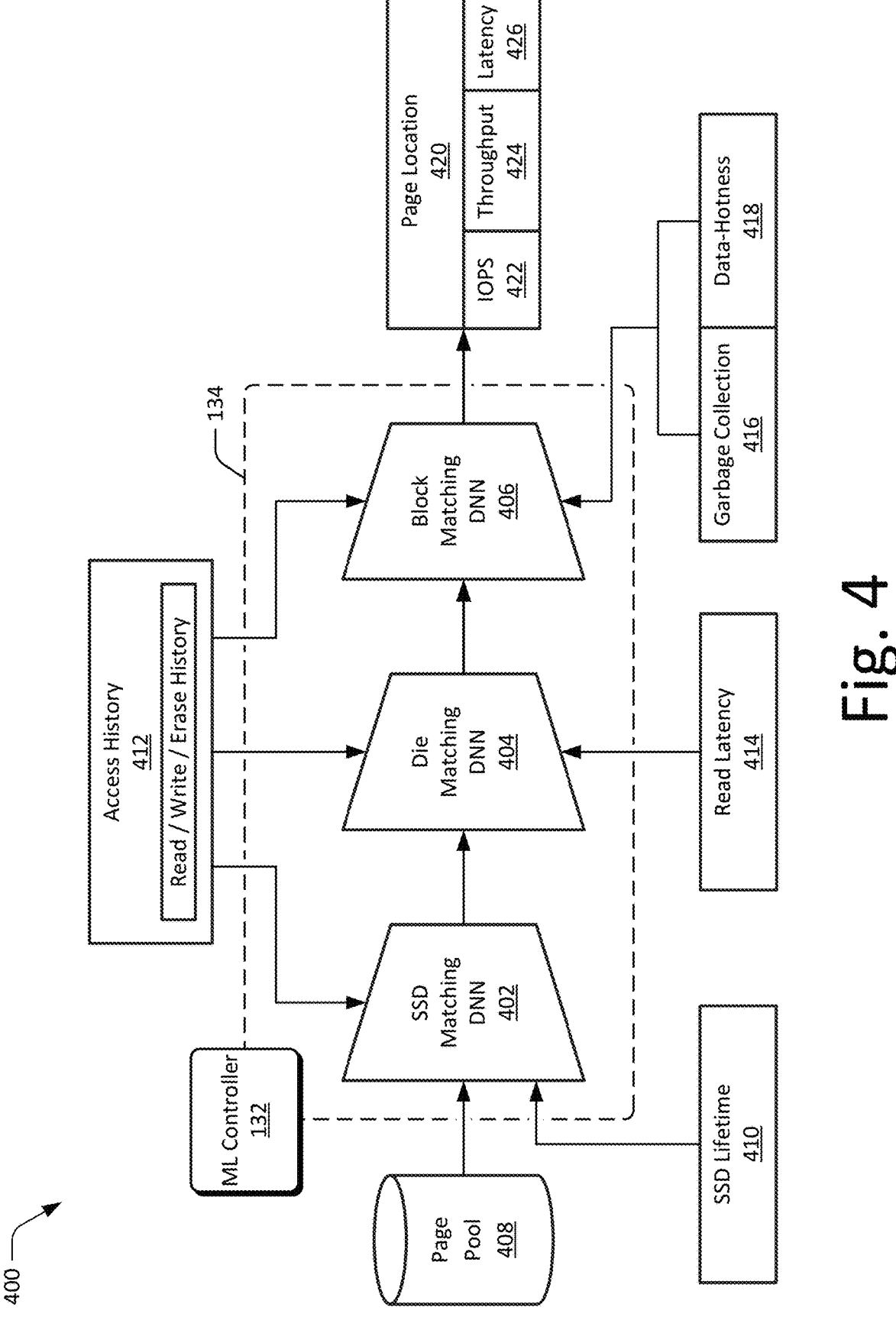
FIG. 4 illustrates an example of a neural network architecture implemented by an ML controller in accordance with one or more aspects.

FIG. 4 illustrates at 400 an example of a neural network architecture implemented by an ML controller in accordance with various aspects. As described herein, an ML controller 132 may include or have access to multiple neural networks 134 that are configured or trained to assist with or optimize placement of write content in storage media of a storage system. The neural networks 134 may be stored in a persistent storage media of the storage system, such as the storage media 124, an internal memory of the storage controller 126 (not shown), or memory of the ML controller 132. In this example, the neural networks 134 are stored on non-volatile memory of the ML controller 132, which is illustrated as a single ML controller for a storage system. The neural networks 134 may include any suitable number of neural networks, which may be configured different from or similar to one another.

In aspects, the neural networks include staged neural networks, shown here as an SSD matching deep neural network (DNN) 402, a die matching DNN 404, and a block matching DNN 406. Generally, these neural networks may interact to progressively determine a location at which to write data from larger to smaller units or granularity of storage media of the storage system. The neural networks may be trained or configured to determine, based on respective characteristics of the storage media and data, placement of write content (e.g., write data) to the storage media of a storage system to optimize quality-of-service (QoS) of the storage system. For example, the first SSD matching network 402 can select an optimal or most appropriate SSD within the storage system to place write content based on respective characteristics of the data and the SSDs. As inputs, the SSD matching DNN 402 may obtain or receive a page pool 408 of available storage media of the system, SSD lifetime information 410 (e.g., stage of life or binned health grade), and access history 412 of the SSDs, which may include the read, write, and/or erase history metrics of the SSDs.

Based on the SSD selected by the first matching DNN, the second die matching DNN 404 can select an optimal or most appropriate die within the SSD based on respective characteristics of the data and the dies of the SSD. As inputs, the die matching DNN 404 may obtain or receive a read latency metric 414 of the dies and the access history 412 of the dies, which may include the read, write, and/or erase history metrics of the dies. Then, based on the die selected by the second matching DNN, the third block matching DNN 406 can select an optimal or most appropriate block within the die based on respective characteristics of the data and the blocks of the die. As inputs, the block matching DNN 406 may obtain or receive a garbage collection policy 416 associated with the blocks, a data-hotness 418 of the data to be written, and the access history 412 of the blocks, which may include the read, write, and/or erase history metrics of the blocks. Based on the inputs from the preceding matching DNNs, characteristics of the data, and characteristics of the storage media, the block matching DNN 406 can provide an optimal or most appropriate page location 420 at which to write the data in the storage media, which may achieve or improve various target characteristics of QoS. For example, the neural networks 134 may be configured or trained to achieve a target level of input/output operations per second 422 (IOPS), throughput 424, and/or latency 426 for data access in the storage system.

As described herein, various aspects of ML-enabled management of storage media access may be implemented by the ML controller 132 that interacts with the neural networks 134 (e.g., FIG. 4, FIG. 8) or any suitable artificial intelligence (AI) engine, AI model, or AI driver of or associated with a storage system controller, write channel, or data mapping component. With respect to processing various features of data and storage media (e.g., data-hotness, block bit-error rate, block program erase cycles), one or more of the neural networks 134 may be implemented with machine-learning that is based on one or more neural networks (e.g., pre-trained) to implement the aspects or techniques described herein, such as matching write content to an optimal write location within a storage drive, die, or block of storage media. Any neural network, AI model, ML algorithm, or the like of the ML controller 132 may include a group of connected nodes, such as neurons or perceptrons, which are organized into one or more layers (e.g., FIG. 8).

Generally, an instance of a neural network 134 associated with the ML controller 132 may be implemented with a deep neural network (DNN) that includes an input layer, an output layer, and one or more hidden intermediate layers positioned between the input layer, pre-input layer (e.g., embedding and/or averaging network), and the output layers of the neural network. Each node of the deep neural network may in turn be fully connected or partially connected between the layers of the neural network. A neural network 134 may be any deep neural network (DNN), such as a convolutional neural network (CNN) including one of AlexNet., ResNet, GoogleNet, MobileNet, or the like. Alternatively or additionally, a neural network 134 may include any suitable recurrent neural network (RNN) or any variation thereof. Generally, a neural network, ML algorithm, or AI model employed by the ML controller 132 may also include any other supervised learning, unsupervised learning, reinforcement learning algorithm, or the like.

In various aspects, a neural network 134 may be implemented as a recurrent neural network with connections between nodes forming a cycle to retain information from a previous portion of an input data sequence for a subsequent portion of the input data sequence (e.g., respective characteristics or features of data or drives, dies, blocks of storage media). Alternately, a neural network 134 may be implemented as a feed-forward neural network having connections between the nodes that do not form a cycle between input data sequences. In yet other cases, a neural network 134 of the ML controller 132 may include a convolutional neural network (CNN) with multilayer perceptrons where each neuron in a given layer is connected with all neurons of an adjacent layer. In some aspects, a neural network 134 is based on a convolutional neural network that may be applied to previous media health scoring to predict or forecast some form of subsequent or future health trend of the storage media. Alternately or additionally, the neural networks 134 may include or utilize various regression models, such as multiple linear regression models, a single linear regression model, logistical regression models, stepwise regression models, multi-variate adaptive regression models, locally estimated scatterplot models, or the like.

Figure 5:
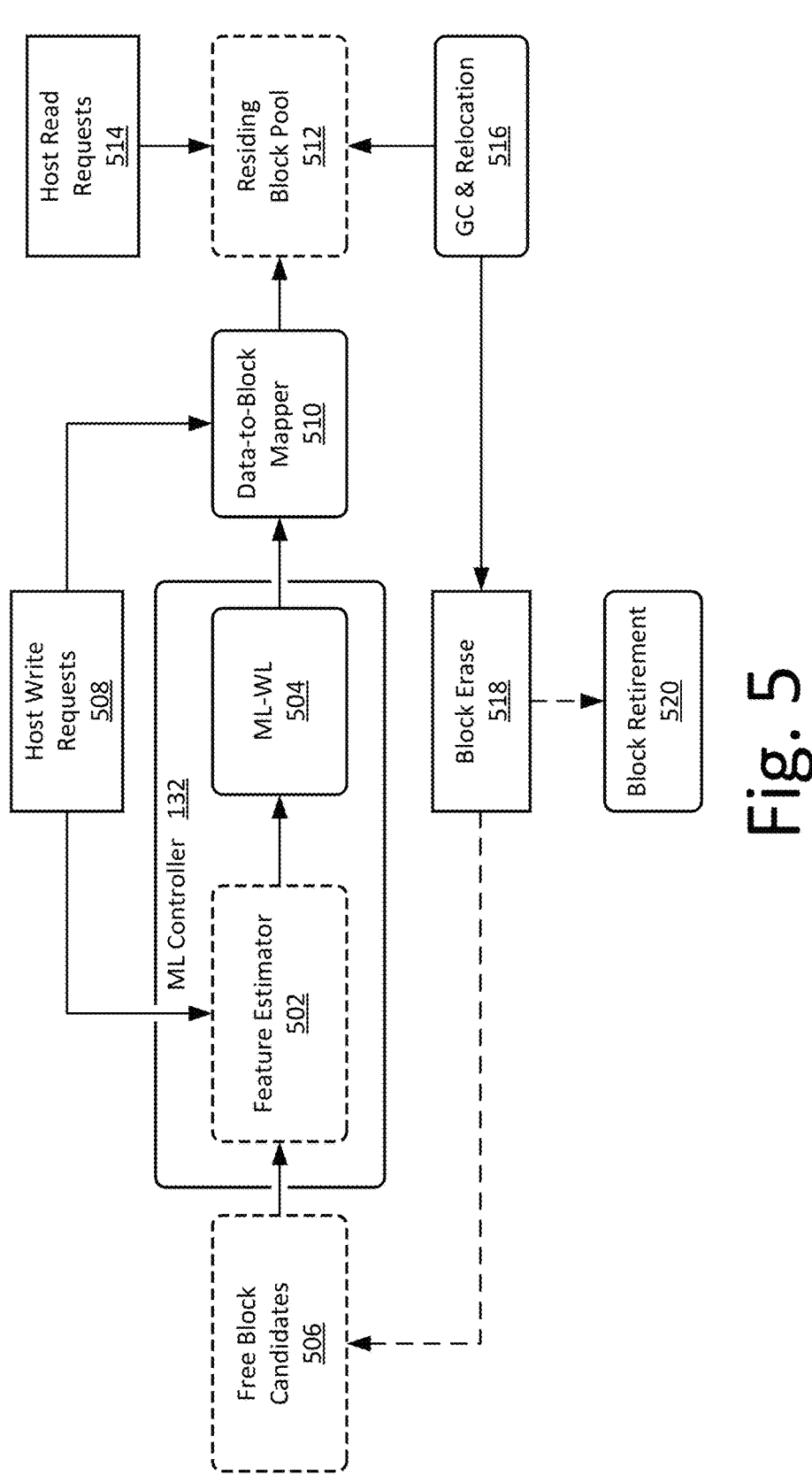
FIG. 5 illustrates an example implementation of a machine learning-enabled wear leveling (ML-WL) architecture in accordance with one or more aspects.

FIG. 5 illustrates at 500 an example implementation of a machine learning-enabled wear leveling (ML-WL) architecture in accordance with aspects described herein. In this example, various functions are shown in the context of a storage controller that may implement aspects of ML-enabled management of storage media access. As described herein, an ML controller 132 of the storage controller may communicate with the host system 102 or ML controller 132 to enable storage drive-level ML-optimized selection of an SSD (not shown) for data placement. Here, the ML controller 132 can implement neural networks to enable optimized data-to-block mapping for an SSD drive. In some aspects, an ML controller 132 may be configured to implement a feature estimator 502 and an ML-WL algorithm 504 to select an optimal or most appropriate block or group of blocks as a destination for write content (data) to improve storage drive performance.

As shown in FIG. 5, the feature estimator 502 may receive an indication of free block candidates 506, such as from a storage controller, media access manager, or flash translation layer of a storage drive. The feature estimator 502 also obtains or receives host write requests 508 or an indication thereof from the storage controller, media access manager, or flash translation layer. In some cases, the feature estimator 502 may access an I/O queue of inbound host I/Os to determine characteristics of the host write requests 508 received from a host. Generally, the feature estimator determines (or generates) respective features or feature metrics for the free block candidates 506 and the data (e.g., write data or write content) of the host write requests. In some cases, the block features include one or more metrics of a historical activity of the block, such as a program erase cycle (PEC) count, a bit-error rate (BER), a binned health grade (health grade), or the like. The data features may include one or more metrics related to activity or characteristics of the data, which may include a data-hotness, data age (e.g., block retention effects), frequency of data access, data write history (e.g., to avoid re-writing to same block), data origin, hot/cold rating of the data, and so forth.

Based on the features of the data and the free block provided by the feature estimator 502, the ML-WL algorithm 504 generates or determines one or more optimal or most appropriate blocks for the writing of the data of the host write requests, such as to achieve desired QoS metrics of the storage system or to improve storage drive performance. In aspects, the ML-WL algorithm 504 provides an indication of the optimal blocks to a data-to-block mapper 510 (or mapping function) of the storage drive, which maps the data of the host write requests 508 to the one or more optimal blocks for writing by the media access manager or storage controller of the storage drive. After writing the data, the media access manager or block controller may update the residing block pool 512, which is also used for host read requests to access data written to the storage media of the storage drive. Other storage controller functions, such as garbage collection and relocation 516, block erasure 518, and block retirement 520 may interact with or operate on the residing block pool 512 as part of internal drive housekeeping, which then updates the free candidate pool 506 for subsequent iterations of ML-optimized data writing.

Figure 6:
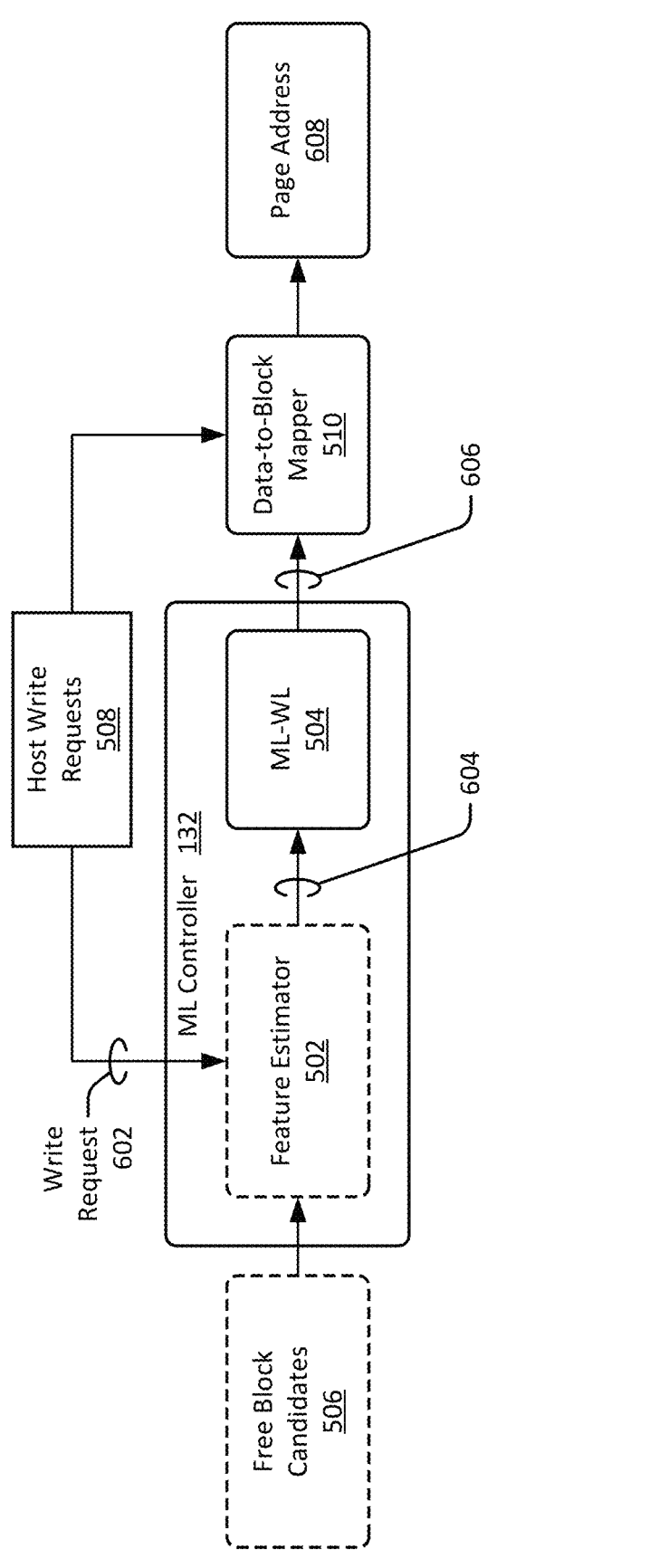
FIG. 6 illustrates an example of data-to-block mapping implemented with the ML-WL architecture of FIG. 5.

As another example, consider FIG. 6 which illustrates at 600 an example of data-to-block mapping implemented with the ML-WL architecture of FIG. 5. FIG. 6 illustrates a simplified ML-WL architecture in which some of the internal or housekeeping functions of the storage controller have been omitted for visual brevity. In the context of ML-WL architecture described with reference to FIG. 5, FIG. 6 shows an example of the ML-WL algorithm 504 assisting the data-to-block mapper 510 with writing data to an optimally selected block of storage media of the storage drive. Here assume that the feature estimator 502 receives an indication of a write request 602, which may include a host I/O to write data to storage media of the storage drive. The feature estimator 502 can determine a data-hotness of the data of the write request 602, as well as feature metrics, such as BER and PEC, for block candidates of the die (e.g., ML-selected die) that are available to receive the write data. Based on the data-hotness of the data and the respective BERs and PECs of the free blocks, the ML-WL algorithm 504 provides, at 606, an optimal block selection for the data to the data-to-block mapper 510. Based on the output of the ML-WL algorithm 504, the data-to-block mapper 510 determines or provides a page address withing the optimal block at which to write the data of the write request 602.

FIG. 7 illustrates at 700 an example configuration of a deep neural network that may implement aspects of ML-enabled management of storage media access. Generally, FIG. 7 illustrates various details of a block matching DNN 702, which may be implemented similar to or different from the block matching DNN 406 of FIG. 4. Thus, the block matching network 704 may implement same or similar operations of the DNN 406 as described in the context of the staged DNNs of FIG. 4, ML-WL algorithm 504, or other neural networks described herein.

In aspects, the block matching DNN 702 may assist with the data-to-block mapping performed by a storage drive controller to implement aspects of ML-enabled management of storage media access. To do so, there are a number of respective data and block features the block matching DNN 702 may obtain and use to provide an indication of one or more optimal blocks at which to write the data of host write requests. In this example, the block matching DNN 702 may receive an indication of available blocks from a block pool 704 and data features 706, which may be provided by a feature estimator of the ML controller 132. In various aspects, features or characteristics of the available blocks may include, for each block (or block group or super block), the PEC of the block, a BER of the block, or a health of the block (e.g., organized or graded into health bins). In some cases, the feature estimator quantizes or processes indicators of the block features or characteristics to provide metrics or grades that are representative of the feature or characteristic of the block. The features or characteristics of the data may include a hot/cold rating, data age, data write history, data origin, and so forth. In some cases, the feature estimator quantizes or processes indicators of the data features or characteristics to provide metrics or grades that are representative of the feature or characteristic of the data of the write request. Based on the respective features of the available and blocks, the block matching DNN 702 may enable block-level ML-optimized access management of storage media. The use of a block matching DNN and other DNNs are described through this disclosure and with greater detail in reference to FIGS. 8-12.

Figure 8:
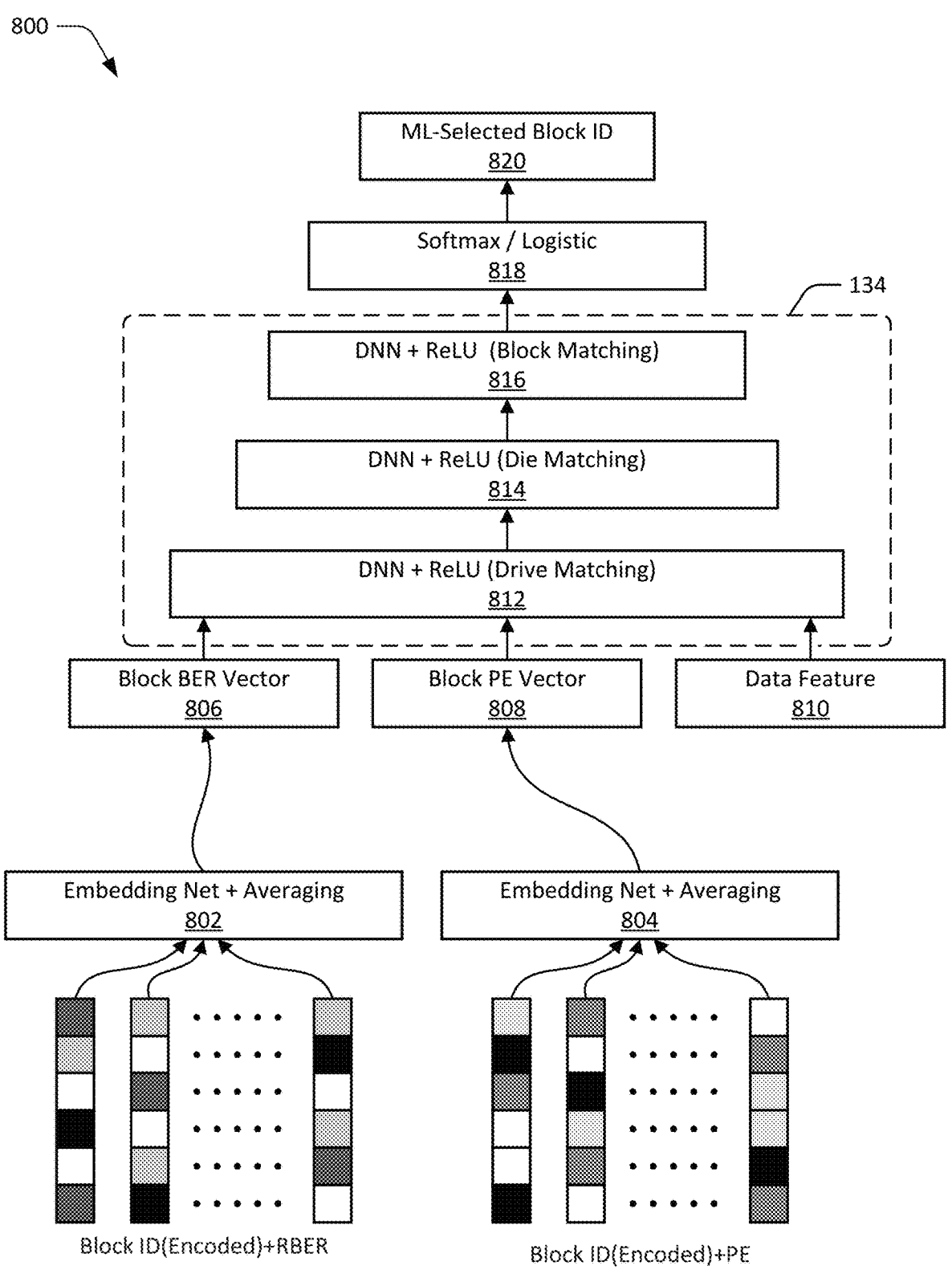
FIG. 8 illustrates an example of a neural network architecture for implementing ML-enabled management of storage media access in accordance with one or more aspects.

FIG. 8 illustrates at 800 an example of a neural network (NN) architecture for implementing ML-enabled management of storage media access in accordance with aspects described herein. Although shown with three DNN stages, the aspects described herein may be implemented using any suitable number or stages of DNNs, which may be configured similar to or different from one another. In aspects, the NN architecture shown in FIG. 8 may be implemented as or in combination with other neural networks or ML algorithms described herein, such as the ML-WL algorithm described in reference to FIGS. 5 and 6. Generally, the NN architecture may receive input data from a feature estimator of the ML controller 132 of a host and/or storage drive controller, such as during training, evaluation, and/or use of the neural network 134.

As an overview, the NN architecture may be configured to provide an identifier of an optimal block at which to write data based on information provided to or coming into the NN architecture. In aspects, the NN architecture includes respective embedding networks for processing information provided to the NN architecture, such as during training of the neural networks 134. In this example, the DNN architecture includes an embedding network and averaging block 802 for a raw bit-error rate (RBER) block feature and an embedding network and averaging block 804 for program erase (PE) block feature, though fewer or additional embedding networks may be used. Generally, the embedding networks can receive, for a dataset of blocks (e.g., FIGS. 9 and 10), encoded data that includes a block identifier (block ID) of a block with a feature or feature metric (e.g., wear leveling condition) of the block. As shown in FIG. 8, the embedding network and averaging block 802 receives, for each block, a binary vector of the block ID encoded with a RBER metric for the block and the embedding network and averaging block 804 receives, for each block, a binary vector of the block ID encoded with a PE metric for the block. In other words, the feature estimator of the ML controller 132 may concatenate features or metrics with a block ID of an available block that is provided to the DNN architecture as a candidate block for data writing. Alternatively or additionally, these encoded or concatenated vectors of the block information may be provided directly to one or more of the neural networks 134.

Generally, the embedding networks may be used in training the neural networks to determine or select an optimal unit of storage at which to place write content based on the respective features of the data and available blocks. In aspects, the embedding networks may extract high-level features of the block IDs to another space. For example, the embedding networks may map the concatenated vectors of the block IDs to another vector, which will represent the high-level features of the blocks selected as inputs to the embedding networks. As part of the averaging, these high-level features can then be averaged over the block vectors to provide feature-specific vectors that are useful to train the neural networks. In the context of the present example, the embedding network and averaging block 802 provides a block BER vector 806 and the embedding network and averaging block 804 provides a block PE vector 808, which are provided in turn to the neural networks 134. Alternatively or additionally, any suitable data features 810, which are described herein, may be provided to the neural networks 134 along with the block feature vectors for training of the neural networks 134.

In aspects, the neural networks 134 may include two or three staged neural networks, which in this example include a drive matching DNN 812, a die matching DNN 814, and a block matching DNN 816. In this example, each of the DNNs may also include a non-linear activation function, which are shown here as rectified linear units (ReLUs), though other types of activation functions, such as sigmoid or hyperbolic tangent, can be used. As described herein, the staged DNNs 134 may provide respective ML-optimized selections of a drive, a die, and/or a block as a location to write data to improve performance of a storage system. In the context of the present example, the DNNs 134 may provide one or more block selections to a softmax and/or logistics block 818, which may provide probabilities or probabilistic values useful to further optimize selection of a target block from a set of candidate blocks. Based on the probabilistic output of the softmax and/or logistics block 818, the DNN architecture of the ML controller 132 provides a ML-selected block ID as the location at which to write data of the host, which may improve various aspects of storage system performance.

Figure 9:
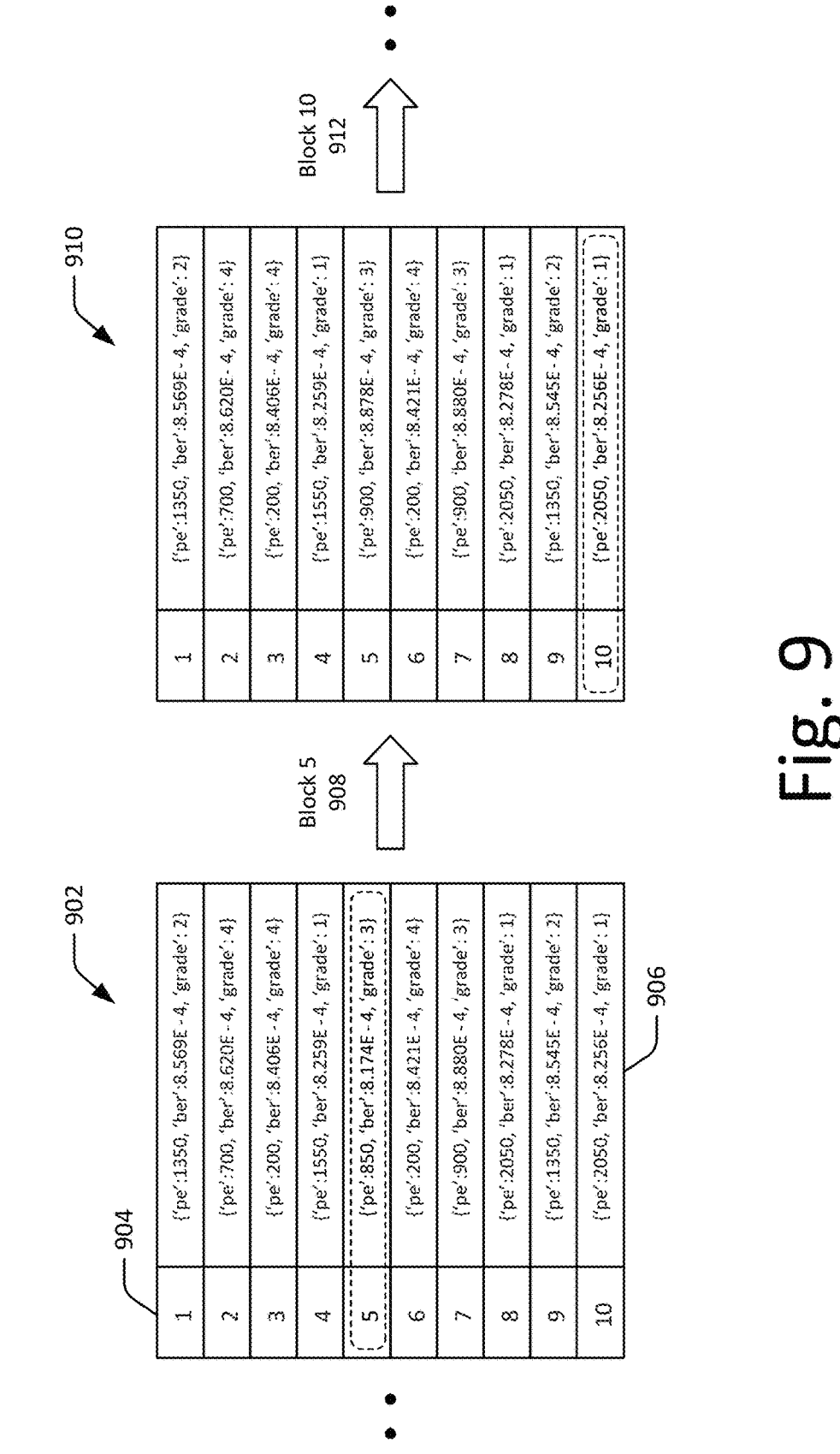
FIG. 9 illustrates an example dataset formulation for training a neural network to implement aspects of ML-enabled management of storage media access.

FIG. 9 illustrates at 900 an example dataset formulation for training a neural network to implement aspects of ML-enabled management of storage media access. For example, datasets and labels described with reference to FIGS. 9-11 may be used as inputs to train the neural networks 134 (e.g., as inputs for the embedding networks). In aspects, data may be labeled to facilitate the training the neural networks 134 to train or teach the neural networks to select an optimal unit of storage through the application of ML algorithms configured with weights based on the training. Instead of implementing wear leveling based on one metric, aspects of ML-enabled management of storage media access can use a combination of block features and data features to select an optimal storage media location for write contents. Thus, the described aspects can combine multiple features as one input vector for the neural networks, which enables the ML algorithms to automatically optimize the management of storage media access based on criteria or metrics of interest (e.g., QoS, read latency, IOPS, throughput, etc.).

As shown in FIG. 9, an example dataset 902 includes ten block entries with respective block IDs 904 and one or more feature metrics 906. Although illustrated as a reduced dataset (e.g., a ten-block die), the training process for the neural networks 134 may include datasets that range from hundreds of block entries to thousands of block entries. In some cases, a block ID 904 and feature metric 906 may correspond to an encoded vector input of the neural networks 134 during training or use. To facilitate training or supervised learning, labels are applied based on a metric of interest, such as the respective PE, BER, or health grade metrics of each block. In the context of FIG. 9, the neural networks 134 are trained based on BER features, with a label applied to Block 5 908 as the candidate block with the lowest BER metric value. The data set can then be updated at 910 (e.g., replacing block 5) with another block entry, which may represent another candidate block obtained from a block pool. Based on the BER criteria, another label is then applied to Block 10 912 as the candidate block with the lowest BER metric value. This labeling process may be performed with a dataset of any suitable size for any suitable number of iterations to train the neural networks 134 to use the BER feature metric in selecting an optimal block using an ML algorithm.

Figure 10:
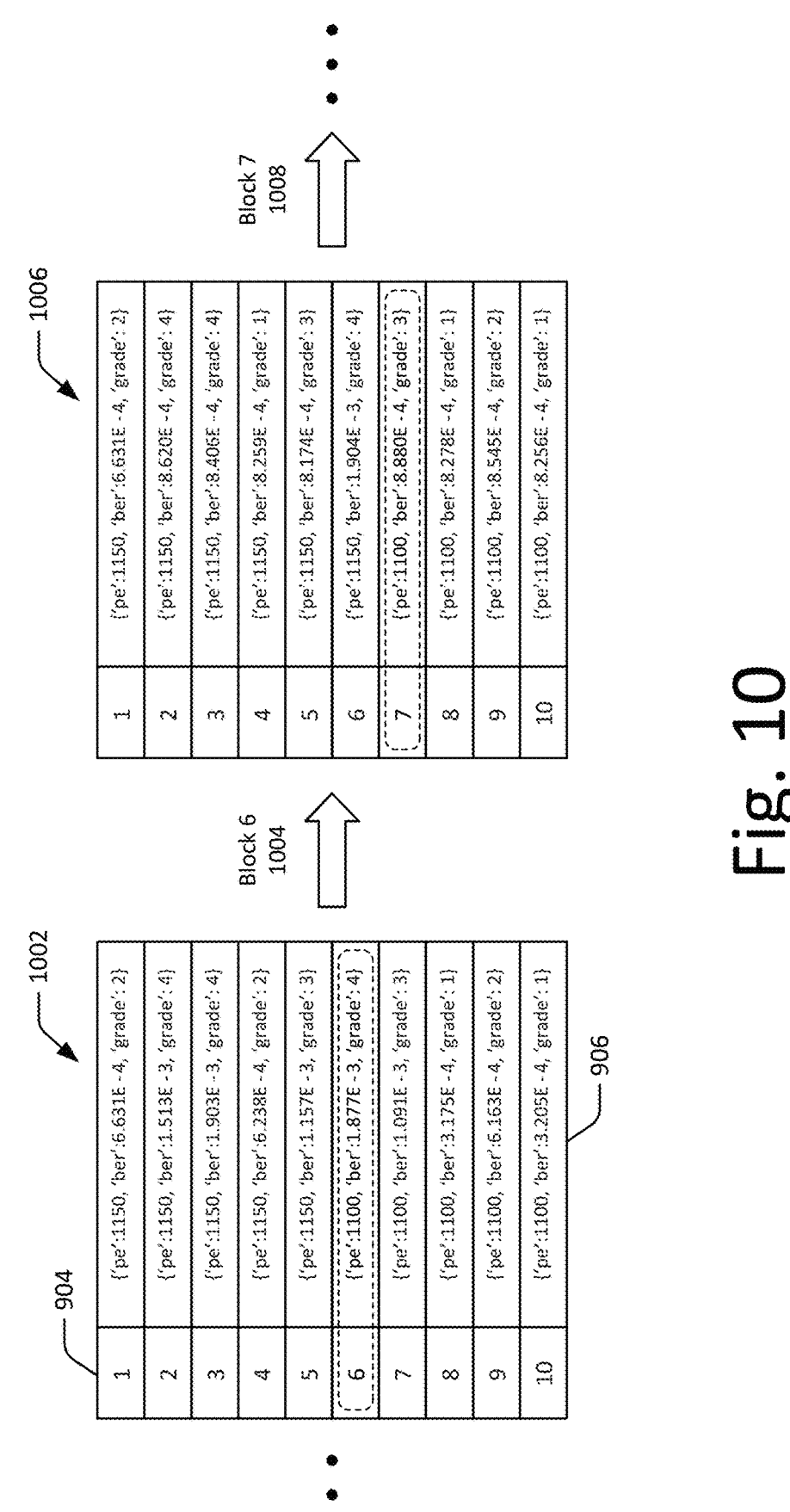
FIG. 10 illustrates another example dataset formulation for training a neural network to implement aspects of ML-enabled management of storage media access.

As another example, consider FIG. 10 in which another example dataset formulation for training a neural network is illustrated at 1000. In this example, labels are applied to another dataset 1002 to train the neural networks 134 based on PE cycle metrics. In the context of FIG. 10, to train the neural networks 134 based on BER features, a label is applied to Block 6 1004 as the candidate block with the lowest PE metric value. The data set can then be updated at 1006 (e.g., replacing block 6) with another block entry, which may represent another candidate block obtained from a block pool. Based on the PE criteria, another label is then applied to Block 7 1008 as the candidate block with the lowest PE metric value or a first candidate block encountered by a labeler with the lowest metric value. As described herein, this labeling process may be performed with a dataset of any suitable size, for any suitable number of iterations, and/or based on any suitable block metric to train the neural networks 134 to use a block feature metric in selecting an optimal block using an ML algorithm.

FIG. 11 illustrates at 1100 an example dataset formulation 1102 for training a neural network to implement aspects of ML-enabled wear leveling in accordance with aspects described herein. In aspects, the neural networks 134 may be trained with any suitable number of different block features, such as PE features, BER features, health grades, and so forth. As shown in FIG. 11, the dataset formulation 1102 may include labels 1104 and input data 1106 of desired block features by which to train the ML algorithms of the ML controller 132. In this example, the dataset formulation 1102 includes a label 1104 for an ML-optimized block selection 1108 (e.g., most appropriate or optimal block) that may be applied to block candidates on input data 1106 based on PE features 1110, BER features 1112, and/or data features 1114. Based on or during the training process, the neural networks 134 may select or determine a block ID 1116 based on respective thresholds learned for block candidates based on a PE metric 1118, a BER metric 1120 and/or a grade metric 1122, which may be provided by the feature estimator of the ML controller. Generally, the dataset formulation 1102 may provide flexibility for adding multiple block or data features to the training process, providing neural networks that are robust to noise in the datasets, and that provide optimal ML-selections of storage media locations based on multiple block features and/or data features.

FIG. 12 illustrates at 1200 an example of updating weights of a neural network architecture that is configured to implement aspects of ML-enabled management of storage media access. Although described in reference to the DNN architecture of FIG. 8, the aspects of updating may be applied to any suitable neural network or ML algorithm of the ML controller 132 of a storage system. Generally, training and evaluation (inference) of the neural networks 134 may be implemented through separate processes. Alternatively or additionally, the ML controller 132 may implement tuning of trained NN or DNN parameter after deployment (with offline-learned parameters). For example, an SSD storage controller may adjust some or all of the parameters of the neural networks based on access patterns of a host system (e.g., data characteristics) and/or performance of the storage media (e.g., block feature trends) in the field.

With respect to adjusting the weights of the neural networks 134 during training, a loss function 1202 may be utilized to update the weights of one or more of the neural networks 134 based on a difference between the labels 1206 and the DNN output 1204 of optimal block selections. In some aspects, the loss function and weight updating may implement an optimization method, such as stochastic gradient descent, adaptive stochastic gradient methods, adaptive moment estimation, or the like. In other words, an ML-WL of an ML controller can be trained with predesigned datasets (e.g., FIGS. 9 and 10). When the network provides outputs, a loss is computed between the outputs and the labels selected during the training process. Due to the loss function being differentiable, the weights or parameters of the NNs or DNNs can be updated through standard or customized optimization methods. With respect to evaluation (inference), optimized storage access or ML-enabled wear leveling may be a dynamic process. Thus, the ML controller can use the learned or updated ML-WL parameters or weights when each write request arrives from a host. With each evaluation by the neural networks 134, a determination or selection is made to which drive, block, or die to allocate content of the current write request.

Techniques for ML-Enabled Management of Storage Media Access

The following discussion describes techniques for ML-enabled management of storage media access, which may select a drive, die, or block of storage media to optimize data placement within a storage system. These techniques may be implemented using any of the environments and entities described herein, such as the media access manager 130, ML controller 132, and/or neural networks 134. These techniques include various methods illustrated in FIGS. 13-16, each of which is shown as a set of operations that may be performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement ML-enabled management of storage media access to match data of a write request to an SSD of a storage system, to a NAND die, and/or block of NAND pages using respective neural networks trained to optimize data placement based on characteristics of available units of storage media and characteristics of the data to be written to the storage media. In portions of the following discussion, reference will be made to the operating environment 100 of FIG. 1 and various entities or configurations of FIGS. 2-12 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 17 and/or the storage system controller of FIG. 18.

FIG. 13 depicts an example method 1300 for ML-enabled management of storage media access, including operations performed by or with the media access manager 130 or ML controller 132 of a media storage controller.

At 1302, an ML controller estimates features of available blocks of storage media. For example, the ML controller may receive an indication of available blocks of storage media of a storage drive or a storage die. The ML controller may then access historical records of the available blocks to estimate the features or obtain metrics of the features.

At 1304, the ML controller receives, from a host system, a request to write data to the storage media. The ML controller may receive an indication of the request from a media access controller of a storage drive or from an ML controller of a host system. In some cases, the ML controller accesses a queue of host I/Os to determine details of received and/or pending host write requests.

At 1306, the ML controller determines features of the data to be written to the storage media. In some cases, the ML controller determines, as the feature of the data, a data age (e.g., block retention effects), frequency of data access, data write history (e.g., to avoid re-writing to same block), data origin, hot/cold rating of the data, and so forth.

At 1308, the ML controller provides the features of the available blocks and the features of the data to a neural network. For example, the ML controller may provide a block BER, a block PE, and a block health rating to the neural network for the available blocks, along with a data-hotness and data age of the data of the write request.

At 1310, the ML controller receives, from the neural network, a selected block of the available blocks of the storage media for the writing of the data. The ML controller may receive one or more selected blocks to which the data may be written. By writing the data to one of the ML-optimized block selections, the ML controller may improve, through optimized wear leveling, a read latency or endurance of the storage media.

At 1312, the media access manager writes the data of the request to the selected block of the storage media. To complete the operation of the write request, the media access manager writes the data of the write request to the optimal block of storage media.

FIG. 14 depicts an example method 1400 for implementing ML-enabled management of storage media access with multiple neural networks, including operations performed by or with the media access manager 130, ML controller 132, or neural networks 134 of a media storage controller.

At 1402, an ML controller provides, to a first neural network (NN), a pool of available storage media formed from multiple storage drives and respective metrics of the multiple storage drives. For example, the ML controller may provide an indication of SSDs with enough capacity to receive write content of a write request.

At 1404, the ML controller receives, from the first NN, a selected storage drive of the multiple storage drives. In some cases, the first NN is configured to match data of one or more write requests to a most appropriate or optimal SSD based on a health of the SSD or feature metrics of available storage media of the SSD.

At 1406, the ML controller provides, to a second NN, a pool of available dies of the selected storage drive and respective metrics of the multiple dies. For example, the ML controller may provide an indication of available dies to the second NN, along with feature metrics for the available dies and data features.

At 1408, the ML controller receives, from the second NN, a selected die of the multiple dies. In some cases, the second NN is configured to match data of one or more write requests to a most appropriate or optimal die within the selected SSD based on feature metrics of the available dies and features of the data to be written.

At 1410, the ML controller provides to a third NN, a pool of available blocks of the selected die and respective metrics of the multiple blocks. For example, the ML controller may provide an indication of available dies to the third DNN, along with feature metrics for the available blocks and data features.

At 1412, the ML controller receives, from the third NN, a selected block of the multiple blocks. In some cases, the third NN is configured to match data of one or more write requests to a most appropriate or optimal block within the selected die based on feature metrics of the available blocks and features of the data to be written. At 1414, the media access manager writes data of a host write request to the selected block to complete the write request of the host.

FIG. 15 depicts an example method 1500 for ML-enabled management of storage media access with embedding networks. In some aspects, the media access manager 130 or the ML controller 132 of a media storage controller perform the operations of the method 1500.

At 1502, an ML controller identifies available blocks of storage media. For example, the ML controller may access a pool of available blocks or receive an indication of the pool of available blocks.

At 1504, the ML controller obtains one or more feature metrics of the available blocks. In some cases, a feature estimator of the ML controller accesses historical records of the data to obtain or determine the feature metrics of the available blocks.

At 1506, the ML controller encodes, for each block, an identifier of the available block with the one or more feature metrics to provide one or more respective vectors representative of the block identifier and the feature metric. In some cases, the ML controller generates a block PE vector, a block BER vector, and/or a block health vector.

At 1508, the ML controller provides, for each block, respective vectors of the blocks to one or more neural networks trained to select an optimized block of the storage media. Thus, the ML controller may provide the block PE vectors, block BER vectors, and/or block health vectors of the available blocks to the neural networks (e.g., neural networks 134).

At 1510, the ML controller provides feature metrics of data to be written to the storage media to the one or more neural networks trained to select an optimized block of the storage media. The feature metrics of the data may include a data age, frequency of data access, data write history, data origin, hot/cold rating of the data, and so forth.

At 1512, the ML controller applies a probabilistic (or logistics) algorithm to a set of candidate blocks provided by the one or more neural networks to determine an optimal block. For example, the ML controller may apply a softmax and/or logistics function to a block selected by the neural networks, which may provide probabilities or probabilistic values useful to further optimize selection of a target block from a set of candidate blocks.

At 1514, the media access manager writes the data to the optimal block of the storage media. To complete the operation of the write request, the media access manager writes the data of the write request to the optimal block of storage media.

FIG. 16 depicts an example method 1600 for training an ML-enabled storage controller, which may enable offline training of the neural networks 134. In some aspects, the media access manager 130 or the ML controller 132 of a media storage controller perform the operations of the method 1600.

At 1602, a dataset is obtained or generated that includes multiple entries for blocks of storage media. The entries may include, for each block, a block identifier with respective metrics associated with the block. In some cases, the data set is a predefined data set useful to train neural networks to select an optimal drive, die, or block to allocate for writing of data.

At 1604, one of the entries of the data set is labeled based on the respective metrics associated with the block identifier. The label may be applied based on desired criteria, such as a lowest BER, a lowest PEC, or a highest health rating or grade. After application of the label, the entry may be evicted from the dataset. Optionally at 1606, the labeled entry of the dataset is replaced with a new entry for the dataset (e.g., FIGS. 9 and 10).

At 1608, an output provided by a neural network based on the dataset is compared with the labels generated for the dataset. For example, the optimal block selections may be compared with the label and then run through a loss function as described with reference to FIG. 12. At 1610, weights of the neural network are updated based on the comparison of the output of the neural network and the labels generated for the dataset to refine the weights or parameters of the neural network.

Figure 17:
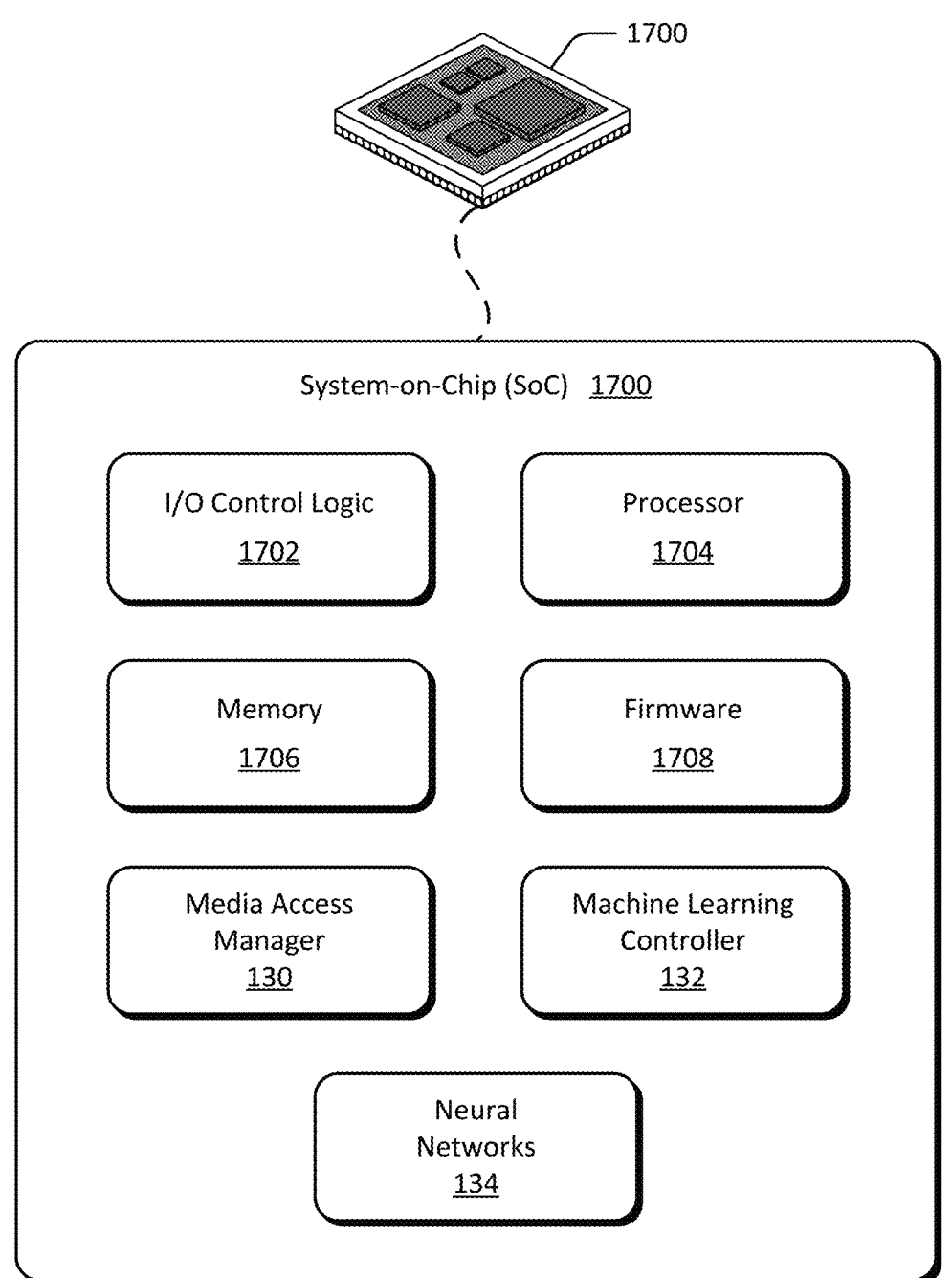
FIG. 17 illustrates an example System-on-Chip (SoC) environment in which aspects of ML-enabled management of storage media access may be implemented.

System-on-Chip and Controller FIG. 17 illustrates an example System-on-Chip (SoC) 1700 environment in which various aspects of ML-enabled management of storage media access may be implemented. The SoC 1700 may be implemented in any suitable system or device, such as a smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, or any other suitable type of device (e.g., others described herein). Although described with reference to a SoC, the entities of FIG. 17 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1700 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 1700 may also include an integrated data bus or interconnect fabric (not shown) that couples the various components of the SoC for control signaling, data communication, and/or routing between the components. The integrated data bus, interconnect fabric, or other components of the SoC 1700 may be exposed or accessed through an external port, parallel data interface, serial data interface, fabric-based interface, peripheral component interface, or any other suitable data interface. For example, the components of the SoC 1700 may access or control external storage media, ML controllers, neural networks, datasets, or AI models, through an external interface or off-chip data interface.

In this example, the SoC 1700 includes various components such as input-output (I/O) control logic 1702 and a hardware-based processor 1704 (processor 1704), such as a microprocessor, processor core, application processor, DSP, or the like. The SoC 1700 also includes memory 1706, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1704 and code stored on the memory 1706 are implemented as a storage system controller or storage aggregator to provide various functionalities associated with ML-enabled management of storage media access. In the context of this disclosure, the memory 1706 stores data, code, instructions, or other information via non-transitory signals, and does not include carrier waves or transitory signals. Alternately or additionally, SoC 1700 may comprise a data interface (not shown) for accessing additional or expandable off-chip storage media, such as solid-state memory (e.g., Flash or NAND memory), magnetic-based memory media, or optical-based memory media.

The SoC 1700 may also include firmware 1708, applications, programs, software, and/or operating system, which may be embodied as processor-executable instructions maintained on the memory 1706 for execution by the processor 1704 to implement functionalities of the SoC 1700. The SoC 1700 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1700. For example, the SoC 1700 may include a transceiver interface configured to enable storage over a wired or wireless network, such as to provide a network attached storage (NAS) volume with ML-enabled management of storage media access.

The SoC 1700 also includes a media access manager 130, ML controller 132, and neural networks 134, which may be implemented separately as shown or combined with a storage component, host controller, data interface, or accessible through an off-chip interface (e.g., neural networks stored to external memory). In accordance with various aspects of ML-enabled management of storage media access, the media access manager 130 may interact with the ML controller 132 and the neural networks 134 to obtain characteristics of available units of storage media, determine characteristics of data to be written to the storage media, and determine, based on the respective characteristics of the storage media and the data, optimal units of the storage media at which to place the data to optimize storage media performance. Alternately or additionally, the ML controller 132 may implement multiple or staged neural networks 134 to determine ML-optimized data placements at a drive-level, die-level, and/or block-level units of storage media. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2 through FIG. 12, and/or the methods of FIGS. 13-16. The media access manager 130 or ML controller 132, either in whole or part, may be implemented as processor-executable instructions maintained by the memory 1706 and executed by the processor 1704 to implement various aspects and/or features of ML-enabled management of storage media access.

The media access manager 130 and/or ML controller 132, may be implemented independently or in combination with any suitable component or circuitry to implement aspects described herein. For example, the media access manager 130 or ML controller 132 may be implemented as part of a DSP, processor/storage bridge, I/O bridge, graphics processing unit, memory controller, storage controller, arithmetic logic unit (ALU), or the like. The media access manager 130 may also be provided integral with other entities of SoC 1700, such as integrated with the processor 1704, memory 1706, a storage media interface, or firmware 1708 of the SoC 1700. Alternately or additionally, the media access manager 130, ML controller 132, and/or other components of the SoC 1700 may be implemented as hardware, firmware, fixed logic circuitry, or any combination thereof.

Figure 18:
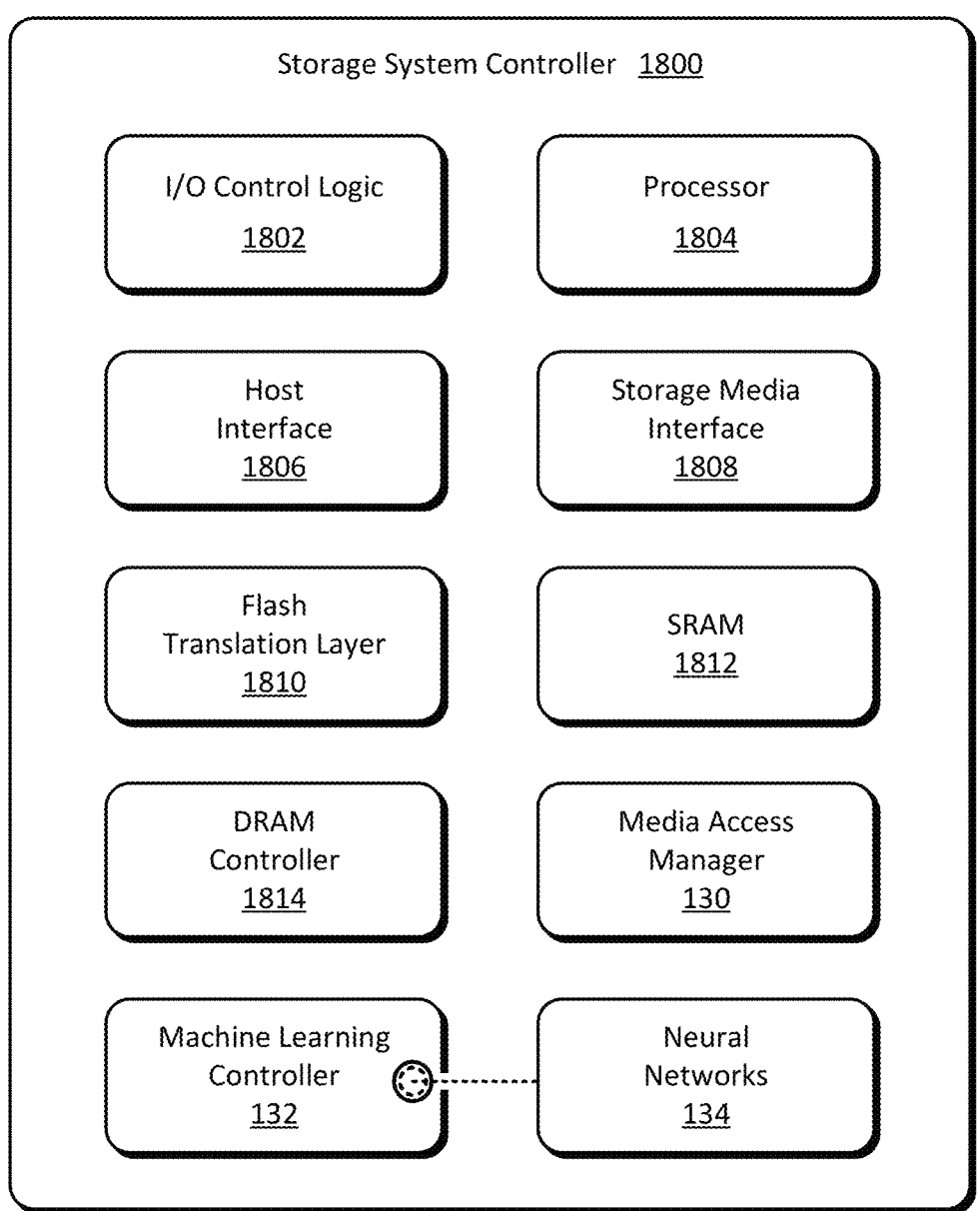
FIG. 18 illustrates an example storage system controller in which an ML controller is implemented in accordance with one or more aspects of the disclosure.

As another example, consider FIG. 18 which illustrates an example storage system controller 1800 in accordance with one or more aspects of ML-enabled management of storage media access. In various aspects, the storage system controller 1800 or any combination of components thereof may be implemented as a storage drive controller, distributed storage center controller (e.g., among a host and SSDs), storage media controller, NAS controller, Fabric interface, NVMe target, or storage aggregation controller for solid-state storage media. In some cases, the storage system controller 1800 is implemented similar to or with components of the SoC 1700 as described with reference to FIG. 17. In other words, an instance of the SoC 1700 may be configured as a storage system controller, such as the storage system controller 1800 to manage solid-state (e.g., NAND Flash-based) media with machine learning for optimized data placement and access.

As shown in FIG. 18, the storage system controller 1800 includes input-output (I/O) control logic 1802 and a processor 1804, such as a microprocessor, processor core, application processor, DSP, or the like. In some aspects, the processor 1804 and firmware of the storage system controller 1800 may be implemented to provide various functionalities associated with ML-enabled management of storage media access, such as those described with reference to any of methods 1400 through 1800. The storage system controller 1800 also includes a host interface 1806 (e.g., SATA, PCIe, NVMe, or Fabric interface) and a storage media interface 1808 (e.g., NAND interface), which enable access to a host system and storage media, respectively. The storage system controller 1800 also includes a Flash translation layer 1810 (FTL 1810), SRAM 1812, and DRAM controller 1814. In some aspects of ML-enabled management of storage media access, the FTL 1810 interacts with a media access manager 130 and/or an ML controller 132 to determine ML-optimized placement of host data at a drive-level unit, die-level unit, and/or block-level unit of storage media operably coupled with the storage media interface 1808.

In this example, the storage system controller 1800 also includes instances of a media access manager 130, ML controller 132, and neural networks 134. Any or all of these components may be implemented separately as shown or combined with the processor 1804, host interface 1806, storage media interface 1808, Flash translation layer 1810, SRAM 1812, and/or DRAM controller 1814. Examples of these components and/or entities, or corresponding functionality, are described with reference to the respective components or entities of the environment 100 of FIG. 1 or respective configurations illustrated in FIG. 2 through FIG. 12. In accordance with various aspects of ML-enabled management of storage media access, the media access manager 130 may interact with the ML controller 132 and the neural networks 134 to obtain characteristics of available units of storage media, determine characteristics of data to be written to the storage media, and determine, based on the respective characteristics of the storage media and the data, optimal units (e.g., locations or page addresses) of the storage media at which to place the data to optimize storage media performance. Alternately or additionally, the ML controller 132 may implement multiple or staged neural networks 134 to determine ML-optimized data placements at a drive-level, die-level, and/or block-level units of storage media as described herein. The ML controller 132, either in whole or part, may be implemented as processor-executable instructions maintained by memory of the controller and executed by the processor 1804 to implement various aspects and/or features of ML-enabled management of storage media access.

In the following, some examples of ML-enabled management of storage media access are described in accordance with one or more aspects:

Example 1: A method for machine learning-enabled management of storage media access, comprising: obtaining features of available blocks of storage media of a storage media system; receiving, from a host system, a request to write data to the storage media; determining features of the data to be written to the storage media; providing the features of the available blocks and the features of the data to a neural network; receiving, from the neural network, a selected block of the available blocks of the storage media for writing of the data of the request; and writing the data of the request to the selected block of storage media of the storage media system.

Example 2: The method of example 1, further comprising: receiving an indication of the available blocks of the storage media; and determining the features of the available blocks of the storage media of the storage media system.

Example 3: The method of example 1 or example 2, wherein the features determined for one of the available blocks comprise one of: a read history of the block; a write history of the block; an erase history of the block; a program erase cycle count of the available block; a bit-error rate of the available block; or a health rating of the available block.

Example 4: The method of any one of examples 1 to 3, wherein the features determined for the data to be written to the storage media comprise one of: a garbage collection policy applied to the data; a data-hotness of the data; a frequency of access of the data; an age of the data; a write history of the data; or an origin on the data.

Example 5: The method of any one of examples 1 to 4, wherein the neural network is a first neural network configured to manage block-level access, and the method further comprises: obtaining features of available storage drives of the storage media system; providing, to a second neural network configured to manage storage drive-level access, features of the available storage drives and at least some of the features of the data to be written to the storage media; receiving, from the second neural network, a selected storage drive of the storage media system for the writing of the data, the selected storage drive comprising the selected block; and writing the data of the request to the selected block of the selected storage drive of the storage media system.

Example 6: The method of any one of examples 1 to 5, wherein the neural network is a first neural network configured to manage block-level access, and the method further comprises: obtaining features of available dies of a storage drive of the storage media system; providing, to a second neural network configured to manage storage die-level access, the features of the available dies and at least some of the features of the data to be written to the storage media; receiving, from the second neural network, a selected die storage drive of the storage media system for the writing of the data, the selected die comprising the selected block; and writing the data of the request to the selected block of the selected die of the storage media system.

Example 7: The method of any one of examples 1 to 6, further comprising: encoding, with an embedding network, block identifiers of the available blocks with metrics of the features of the available blocks to provide vectors representative of the available blocks; and providing, to the neural network and as the features of the available blocks, the vectors that comprise the block identifiers and the metrics of the features of the available blocks.

Example 8: The method of example 7, wherein the vectors representative of the available blocks represent: a block identifier of an available block and a bit-error rate metric of the available block; or a block identifier of an available block and a program erase cycle metric of the available block.

Example 9: The method of any one of examples 1 to 8, further comprising; generating a dataset of multiple entries that comprise a block identifier with respective feature metrics associated with the block identifier; iteratively labeling entries of the dataset to provide labels for the dataset based on the respective feature metrics of the block identifiers; comparing an output of the neural network with the labels generated for the dataset; and updating weights of the neural network based on the comparison of the output of the neural network and the labels generated for the data set.

Example 10. The method of any one of examples 1 to 9, wherein: the storage media comprises one of solid-state storage media; NAND Flash memory, single-level cell (SLC) Flash memory, multi-level cell (MLC) Flash memory, triple-level cell (TLC) Flash, quad-level cell Flash (QLC), or NOR cell Flash.

Example 11. The method of any one of examples 1 to 10, wherein: the method is implemented by a machine learning-enabled controller embodied on a host controller operably associated with the storage media system, a storage drive controller of the storage media system, or an aggregate storage controller of the storage media system.

Example 12. The method of any one of examples 1 to 11, further comprising training the neural network with a predefined dataset that comprises multiple entries that correspond to available blocks of storage media, each entry comprising a block identifier and at least two feature metrics of the block.

Example 13. The method of example 11, further comprising updating parameters or weights of the neural network based on a difference between blocks selected by the neural network and labels of the predefined dataset.

Example 14. The method of any one of examples 1 to 13, further comprising applying a soft-information or probabilistic algorithm to the block selected by the neural network and at least one other block selected by the neural network to facilitate data-to-block mapping of the data in the storage media.

Example 15: An apparatus comprising: a host interface configured for communication with a host system; storage media to store data of the host system; a media interface configured to enable access to the storage media; a machine learning-enabled (ML-enabled) controller configured to implement a neural network; and a media access manager configured to: obtain features of available blocks of the storage media of the apparatus; receive, from the host system, a request to write data to the storage media of the apparatus; determine features of the data to be written to the storage media; provide the features of the available blocks and the features of the data to the ML-enabled controller; receive, from the ML-enabled controller, a selected block of the available blocks of the storage media for writing of the data of the request; and write the data of the request to the selected block of storage media of the apparatus.

Example 16: The apparatus of example 15, wherein the features determined for one of the available blocks comprise one of: a read history of the block; a write history of the block; an erase history of the block; a program erase cycle count of the available block; a bit-error rate of the available block; or a health rating of the available block.

Example 17: The apparatus of example 15 or example 16, wherein the features determined for the data to be written to the storage media comprise one of: a garbage collection policy applied to the data; a data-hotness of the data; a frequency of access of the data; an age of the data; a write history of the data; or an origin on the data.

Example 18: The apparatus of any one of examples 15 to 17, wherein the neural network is a first neural network configured to manage block-level access, the ML-enabled controller is further configured to implement a second neural network configured to manage die-level access, and the media access manager is further configured to: obtain features of available dies of the storage media system; provide, to the second neural network, the features of the available dies and at least some of the features of the data to be written to the storage media; receive, from the second neural network, a selected die of the storage media system for the writing of the data, the selected die comprising the selected block; and write the data of the request to the selected block of the selected die of the storage media system.

Example 19: The apparatus of any one of examples 15 to 18, wherein the ML-enabled controller is further configured to implement an embedding network and media access manager is further configured to: encode, with the embedding network, block identifiers of the available blocks with metrics of the features of the available blocks to provide vectors representative of the available blocks; and provide, to the neural network and as the features of the available blocks, the vectors that comprise the block identifiers and the metrics of the features of the available blocks.

Example 20: A System-on-Chip (SoC) comprising: a media interface to access storage media of a storage media system; a host interface to communicate with a host system; a machine learning-enabled (ML-enabled) controller configured to implement a neural network; a hardware-based processor; a memory storing processor-executable instructions that, responsive to execution by the hardware-based processor, implement a media access manager to: obtain features of available blocks of the storage media of the storage media system; receive, from the host system, a request to write data to the storage media of the storage media system; determine features of the data to be written to the storage media; provide the features of the available blocks and the features of the data to the ML-enabled controller; receive, from the ML-enabled controller, a selected block of the available blocks of the storage media for writing of the data of the request; and write the data of the request to the selected block of storage media of the storage media system.

Example 21: The SoC of example 20, wherein the features determined for one of the available blocks comprise at least two of: a read history of the block; a write history of the block; an erase history of the block; a program erase cycle count of the available block; a bit-error rate of the available block; or a health rating of the available block.

Example 22: The SoC of example 20 or example 21, wherein the features determined for the data to be written to the storage media comprise at least two of: a garbage collection policy applied to the data; a data-hotness of the data; a frequency of access of the data; an age of the data; a write history of the data; or an origin on the data.

Example 23: The SoC of any one of examples 20 to 22, wherein the ML-enabled controller is further configured to implement an embedding network and media access manager is further configured to: encode, with the embedding network, block identifiers of the available blocks with metrics of the features of the available blocks to provide vectors representative of the available blocks; and provide, to the neural network and as the features of the available blocks, the vectors that comprise the block identifiers and the metrics of the features of the available blocks.

Example 24: The SoC of any one of examples 20 to 23, wherein the vectors representative of the available blocks represent: a block identifier of an available block and a bit-error rate metric of the available block; and a block identifier of an available block and a program erase cycle metric of the available block.

Although the subject matter of ML-enabled management of storage media access has been described in language specific to structural features and/or methodological operations, it is to be understood that the subject matter defined in the appended claims is not necessarily limited to the specific examples, features, or operations described herein, including orders in which they are performed.

What is claimed is:

1. A method for machine learning-enabled management of storage media access, comprising:

obtaining, by a machine learning-enabled (ML-enabled) controller of a storage media controller, features of available blocks of storage media of a storage media system, the storage media controller operably coupled with the storage media of the storage media system via a media interface of the storage media controller, the ML-enabled controller implemented by a hardware-based processor executing instructions from hardware-based memory of the storage media controller;

encoding, with the ML-enabled controller of the storage media controller, block identifiers of the available blocks of the storage media with respective metrics of the features of the available blocks to provide, for each of the available blocks, a first vector representative of a block identifier and a bit-error rate metric of the available block and a second vector representative of the block identifier and a program erase cycle metric of the available block;

receiving, by the storage media controller, a write request from a host system to write data to the storage media, the host system operably coupled to the storage media controller via a host interface of the storage media controller;

determining, by the ML-enabled controller, features of the data of the write request based on metrics of the data of the write request;

selecting, using a neural network of the ML-enabled controller, a block of the available blocks of the storage media for writing the data of the write request based on the first vectors representative of the block identifiers and the bit-error rate metric of the available blocks, the second vectors representative of the block identifiers and the program erase cycle metrics of the available blocks, and the features of the data of the write request; and writing, by the storage media controller, the data of the write request to the selected block of the storage media of the storage media system to complete the write request from the host system to write the data to the storage media.

2. The method of claim 1, further comprising:

receiving, by the ML-enabled controller, an indication of the available blocks of the storage media; and determining, by the ML-enabled controller, the features of the available blocks of the storage media of the storage media system.

3. The method of claim 2, wherein the features obtained for one of the available blocks comprise one of:

a read history of the available block;
a write history of the available block;
an erase history of the available block;
a program erase cycle count of the available block;
a bit-error rate of the available block; or
a health rating of the available block.

4. The method of claim 1, wherein the features determined for the data of the write request comprise one of:

a garbage collection policy applied to the data of the write request;
a data-hotness of the data of the write request;
a frequency of access of the data of the write request;
an age of the data of the write request;
a write history of the data of the write request; or
an origin of the data of the write request.

5. The method of claim 1, wherein the neural network is a first neural network of the ML-enabled controller that is configured to manage block-level access, and the method further comprises:

obtaining features of available storage drives of the storage media system;

selecting, using a second neural network of the ML-enabled controller that is configured to manage storage drive-level access, a storage drive of the storage media for writing the data of the write request based the features of the available storage drives and the features of the data of the write request; and writing the data of the write request to the selected block of the selected storage drive of the storage media system.

6. The method of claim 1, wherein the neural network is a first neural network of the ML-enabled controller that is configured to manage block-level access, and the method further comprises:

obtaining features of available dies of a storage drive of the storage media system;

selecting, using a second neural network of the ML-enabled controller that is configured to manage die-level access, a die of the storage media for writing the data of the write request based the features of the available dies and the features of the data of the write request; and writing the data of the write request to the selected block of the selected die of the storage media system.

7. The method of claim 1, further comprising;

generating, by the ML-enabled controller, a dataset of multiple entries that comprise a block identifier with respective feature metrics associated with the block identifier;

iteratively, by the ML-enabled controller, labeling entries of the dataset to provide labels for the dataset based on the respective feature metrics of the block identifiers;

comparing, by the ML-enabled controller, an output of the neural network with the labels generated for the dataset; and updating, by the ML-enabled controller, weights of the neural network based on the comparing of the output of the neural network and the labels generated for the dataset.

8. The method of claim 1, wherein:

the storage media comprises one of solid-state storage media, NAND Flash memory, single-level cell (SLC) Flash memory, multi-level cell (MLC) Flash memory, triple-level cell (TLC) Flash, quad-level cell Flash (QLC), or NOR cell Flash.

9. The method of claim 1, wherein:

each of the first vectors comprises a binary vector of the block identifier encoded with the bit-error rate metric of the available block; or each of the second vectors comprises a binary vector of the block identifier encoded with the program erase cycle metric of the available block.

10. A System-on-Chip (SoC) comprising:

a media interface to access storage media of a storage media system;

a host interface to communicate with a host system;

a hardware-based processor; and hardware-based memory storing a neural network and processor-executable instructions that, responsive to execution by the hardware-based processor, implement a machine learning-enabled (ML-enabled) controller to:

obtain features of available blocks of the storage media of the storage media system;

encode block identifiers of the available blocks with respective metrics of the features of the available blocks to provide, for each of the available blocks, a first vector representative of a block identifier and a bit-error rate metric of the available block and a second vector representative of the block identifier and a program erase cycle metric of the available block;

receive, from the host system, a write request to write data to the storage media of the storage media system;

determine features of the data of the write request based on metrics of the data of the write request;

select, using the neural network, a block of storage media from the available blocks of the storage media for writing the data of the write request based on the first vectors representative of the block identifiers and the bit-error rate metric of the available blocks, the second vectors representative of the block identifiers and the program erase cycle metrics of the available blocks, and the features of the data of the write request; and write the data of the write request to the selected block of the storage media of the storage media system.

11. The SoC of claim 10, wherein the features obtained for one of the available blocks comprise at least two of:

a read history of the available block;

a write history of the available block;

an erase history of the available block;

a program erase cycle count of the available block;

a bit-error rate of the available block; or a health rating of the available block.

12. The SoC of claim 10, wherein the features determined for the data of the write request comprise at least two of:

a garbage collection policy applied to the data of the write request;

a data-hotness of the data of the write request;

a frequency of access of the data of the write request;

an age of the data of the write request;

a write history of the data of the write request; or an origin of the data of the write request.

13. The SoC of claim 10, wherein the ML-enabled controller is further implemented to:

receive an indication of the available blocks of the storage media; and determine the features of the available blocks of the storage media of the storage media system.

14. The SoC of claim 10, wherein the neural network is a first neural network configured to manage block-level access, the hardware-based memory stores a second neural network configured to manage storage drive-level access, and the ML-enabled controller is further implemented to:

obtain features of available storage drives of the storage media system;

select, using the second neural network, a storage drive of the storage media for writing the data of the write request based the features of the available storage drives and the features of the data of the write request; and writing the data of the write request to the selected block of the selected storage drive of the storage media system.

15. The SoC of claim 10, wherein the neural network is a first neural network configured to manage block-level access, the hardware-based memory stores a second neural network configured to manage storage die-level access, and the ML-enabled controller is further implemented to:

obtain features of available dies of a storage drive of the storage media system;

select, with the second neural network, a die of the storage media for writing the data of the write request based the features of the available dies and the features of the data of the write request; and write the data of the write request to the selected block of the selected die of the storage media system.

16. An apparatus comprising:

a host interface configured for communication with a host system;

storage media to store data of the host system;

a media interface configured to enable access to the storage media;

a hardware-based processor; and hardware-based memory storing a neural network and processor-executable instructions that, responsive to execution by the hardware-based processor, implement a machine learning-enabled (ML-enabled) controller to:

obtain features of available blocks of the storage media of the apparatus;

encode block identifiers of the available blocks with respective metrics of the features of the available blocks to provide, for each of the available blocks, a first vector representative of a block identifier and a bit-error rate metric of the available block and a second vector representative of the block identifier and a program erase cycle metric of the available block;

receive, from the host system, a write request to write data to the storage media of the apparatus;

determine features of the data of the write request based on metrics of the data of the write request;

select, with the neural network, a block of the available blocks of the storage media for writing the data of the write request based on the first vectors representative of the block identifiers and the bit-error rate metric of the available blocks, the second vectors representative of the block identifiers and the program erase cycle metrics of the available blocks, and the features of the data of the write request; and write the data of the write request to the selected block of the storage media of the apparatus.

17. The apparatus of claim 16, wherein the ML-enabled controller is further implemented to:

receive an indication of the available blocks of the storage media; and determine the features of the available blocks of the storage media of the apparatus.

18. The apparatus of claim 16, wherein the features determined for the data of the write request comprise one of:

a garbage collection policy applied to the data of the write request;

a data-hotness of the data of the write request;

a frequency of access of the data of the write request;

an age of the data of the write request;

a write history of the data of the write request; or an origin of the data of the write request.

19. The apparatus of claim 16, wherein the neural network is a first neural network configured to manage block-level access, the hardware-based memory stores a second neural network configured to manage storage die-level access, and the ML-enabled controller is further implemented to:

obtain features of available dies of a storage drive of the apparatus;

select, with the second neural network, a die of the storage media for writing the data of the write request based the features of the available dies and the features of the data of the write request; and write the data of the write request to the selected block of the selected die of the apparatus.

20. The apparatus of claim 19, wherein the ML-enabled controller is further implemented to:

receive an indication of the available dies of a storage drive of the apparatus; and determine the features of the available dies of the storage media of the apparatus.

* * * * *